(12) United States Patent
Si et al.

(10) Patent No.: US 11,456,831 B2
(45) Date of Patent: Sep. 27, 2022

(54) METHOD AND APPARATUS FOR CSI-RS ENHANCEMENT FOR NR UNLICENSED SPECTRUM

(71) Applicant: Samsung Electronics Co., Ltd., Suwon-si (KR)

(72) Inventors: Hongbo Si, Plano, TX (US); Yingzhe Li, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 16/823,108

(22) Filed: Mar. 18, 2020

(65) Prior Publication Data

US 2020/0304260 A1 Sep. 24, 2020

Related U.S. Application Data

(60) Provisional application No. 62/972,933, filed on Feb. 11, 2020, provisional application No. 62/822,347, filed on Mar. 22, 2019.

(51) Int. Cl.
*H04L 12/28* (2006.01)
*H04L 5/00* (2006.01)
(Continued)

(52) U.S. Cl.
CPC .......... *H04L 5/0048* (2013.01); *H04L 5/0053* (2013.01); *H04W 16/14* (2013.01)

(58) Field of Classification Search
CPC ... H04L 5/0048; H04L 27/261; H04L 5/0051; H04L 27/2655; H04L 1/1671;
(Continued)

(56) References Cited

U.S. PATENT DOCUMENTS

2018/0103445 A1  4/2018  Akkarakaran et al.
2019/0058517 A1  2/2019  Kang et al.
(Continued)

FOREIGN PATENT DOCUMENTS

EP           3471318 A1   4/2019
KR   10-2018-0089901 A   8/2018
(Continued)

OTHER PUBLICATIONS

International Search Report dated Jun. 29, 2020 in connection with International Patent Application No. PCT/KR2020/003902, 3 pages.
(Continued)

*Primary Examiner* — John Pezzlo

(57) ABSTRACT

A method and apparatus in a wireless communication system supporting a shared spectrum channel access is provided. The method and apparatus comprises: receiving, from a base station (BS), system information indicating a discovery burst transmission window; determining a number $N_{SSB}^{QCL}$ of candidate synchronization signal and physical broadcast channel (SS/PBCH) blocks as an interval for a quasi-co-locate (QCL) assumption; determining a set of QCLed candidate SS/PBCH blocks within the discovery burst transmission window based on the number $N_{SSB}^{QCL}$ of candidate SS/PBCH blocks; determining a set of QCLed occasions within the discovery burst transmission window included in the system information; and receiving, from the BS, a channel state information reference signal (CSI-RS) resource based on the determined set of QCLed occasions within the discovery burst transmission window.

20 Claims, 12 Drawing Sheets

(51) Int. Cl.
  *H04W 16/14* (2009.01)
  *H04J 1/16* (2006.01)
(58) Field of Classification Search
  CPC .. H04L 5/0053; H04W 56/001; H04W 56/00; H04W 48/12; H04B 7/0626; H04B 7/088
  USPC ........................................ 370/252, 329, 503
  See application file for complete search history.

(56) References Cited

U.S. PATENT DOCUMENTS

| | | | |
|---|---|---|---|
| 2019/0379431 A1 | 12/2019 | Park et al. | |
| 2020/0053637 A1* | 2/2020 | Tsai | H04L 5/0051 |
| 2020/0288479 A1* | 9/2020 | Xi | H04B 7/02 |
| 2021/0250991 A1* | 8/2021 | Liu | H04W 74/00 |
| 2021/0282079 A1* | 9/2021 | Wu | H04L 5/005 |
| 2022/0124633 A1* | 4/2022 | Hoshino | H04W 72/04 |
| 2022/0124819 A1* | 4/2022 | Zhang | H04B 7/0695 |

FOREIGN PATENT DOCUMENTS

| | | |
|---|---|---|
| WO | 2017/142589 A1 | 8/2017 |
| WO | 2018128410 A1 | 7/2018 |
| WO | 2019/017751 A1 | 1/2019 |

OTHER PUBLICATIONS

Written Opinion of the International Searching Authority dated Jun. 29, 2020 in connection with International Patent Application No. PCT/KR2020/003902, 5 pages.

"3rd Generation Partnership Project; Technical Specification Group Radio Access Network; NR; Physical channels and modulation (Release 15)", 3GPP TS 38.211 V15.4.0, Dec. 2018, 96 pages.

"3rd Generation Partnership Project; Technical Specification Group Radio Access Network; NR; Multiplexing and channel coding (Release 15)", 3GPP TS 38.212 V15.4.0, Dec. 2018, 100 pages.

"3rd Generation Partnership Project; Technical Specification Group Radio Access Network; NR; Physical layer procedures for control (Release 15)" 3GPP TS 38.213 V15.4.0, Dec. 2018, 104 pages.

"3rd Generation Partnership Project; Technical Specification Group Radio Access Network; NR; Physical layer procedures for data (Release 15)", 3GPP TS 38.214 V15.4.0, Dec. 2018, 102 pages.

"3rd Generation Partnership Project; Technical Specification Group Radio Access Network; NR; Physical layer measurements (Release 15)", 3GPP TS 38.215 V15.4.0, Dec. 2018, 15 pages.

"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.

Extended European Search Report dated Feb. 3, 2022 regarding Application No. 20777530.5, 10 pages.

Qualcomm Incorporated, "Feature lead summery on initial access signals and channels for NR-U", 3GPP TSG RAN WG1 Meeting #96, R1-1903404, Feb. 2019, 33 pages.

* cited by examiner (d) Collision in symbol&RB-level (e) Collision in symbol&RE-level

US 11,456,831 B2

METHOD AND APPARATUS FOR CSI-RS ENHANCEMENT FOR NR UNLICENSED SPECTRUM

CROSS-REFERENCE TO RELATED APPLICATIONS AND CLAIM OF PRIORITY

The present application claims priority to U.S. Provisional Patent Application No. 62/822,347, filed on Mar. 22, 2019 and U.S. Provisional Patent Application No. 62/972,933, filed on Feb. 11, 2020. The content of the above-identified patent document is incorporated herein by reference.

TECHNICAL FIELD

The present application relates generally to wireless communication systems, more specifically, the present disclosure relates to CSI-RS enhancement for NR unlicensed spectrum.

BACKGROUND

A communication system includes a downlink (DL) that conveys signals from transmission points such as base stations (BS s) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

SUMMARY

The present disclosure relates to a pre-5G or 5G communication system to be provided for CSI-RS enhancement for NR unlicensed spectrum.

In one embodiment, a user equipment (UE) in a wireless communication system supporting a shared spectrum channel access is provided. The UE comprises: a transceiver configured to receive, from a base station (BS), system information indicating a discovery burst transmission window. The UE further comprises a processor operably connected to the transceiver, the processor configured to: determine a number $N_{SSB}^{QCL}$ of candidate synchronization signal and physical broadcast channel (SS/PBCH) blocks as an interval for a quasi-co-locate (QCL) assumption, determine a set of QCLed candidate SS/PBCH blocks within the discovery burst transmission window based on the number $N_{SSB}^{QCL}$ of candidate SS/PBCH blocks, and determine a set of QCLed occasions within the discovery burst transmission window included in the system information, wherein the transceiver is further configured to receive, from the BS, a channel state information reference signal (CSI-RS) resource based on the determined set of QCLed occasions within the discovery burst transmission window.

In another embodiment, a base station (BS) in a wireless communication system supporting a shared spectrum channel access is provided. The BS comprises a processor configured to: determine a number $N_{SSB}^{QCL}$ of candidate synchronization signal and physical broadcast channel (SS/PBCH) blocks as an interval for a quasi-co-locate (QCL) assumption, determine a set of QCLed candidate SS/PBCH blocks within a discovery burst transmission window based on the number $N_{SSB}^{QCL}$ of candidate SS/PBCH blocks, and determine a set of QCLed occasions within the discovery burst transmission window. The BS further comprises a transceiver operably connected to the processor, the transceiver configured to: transmit, to a user equipment (UE), system information indicating the discovery burst transmission window, and transmit, to the UE, a channel state information reference signal (CSI-RS) resource based on the determined set of QCLed occasions within the discovery burst transmission window.

In yet another embodiment, a method of a user equipment (UE) in a wireless communication system supporting a shared spectrum channel access is provided. The method comprises: receiving, from a base station (BS), system information indicating a discovery burst transmission window; determining a number $N_{SSB}^{QCL}$ of candidate synchronization signal and physical broadcast channel (SS/PBCH) blocks as an interval for a quasi-co-locate (QCL) assumption; determining a set of QCLed candidate SS/PBCH blocks within the discovery burst transmission window based on the number $N_{SSB}^{QCL}$ of candidate SS/PBCH blocks; determining a set of QCLed occasions within the discovery burst transmission window included in the system information; and receiving, from the BS, a channel state information reference signal (CSI-RS) resource based on the determined set of QCLed occasions within the discovery burst transmission window.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.4.0, "NR; Physical channels and modulation;" 3GPP TS 38.212 v15.4.0, "NR; Multiplexing and Channel coding;" 3GPP TS 38.213 v15.4.0, "NR; Physical Layer Procedures for Control;" 3GPP TS 38.214 v15.4.0, "NR; Physical Layer Procedures for Data;" 3GPP TS 38.215 v15.4.0, "NR; Physical Layer Measurements;" and 3GPP TS 38.331 v15.4.0, "NR; Radio Resource Control (RRC) Protocol Specification."

Figure 1:
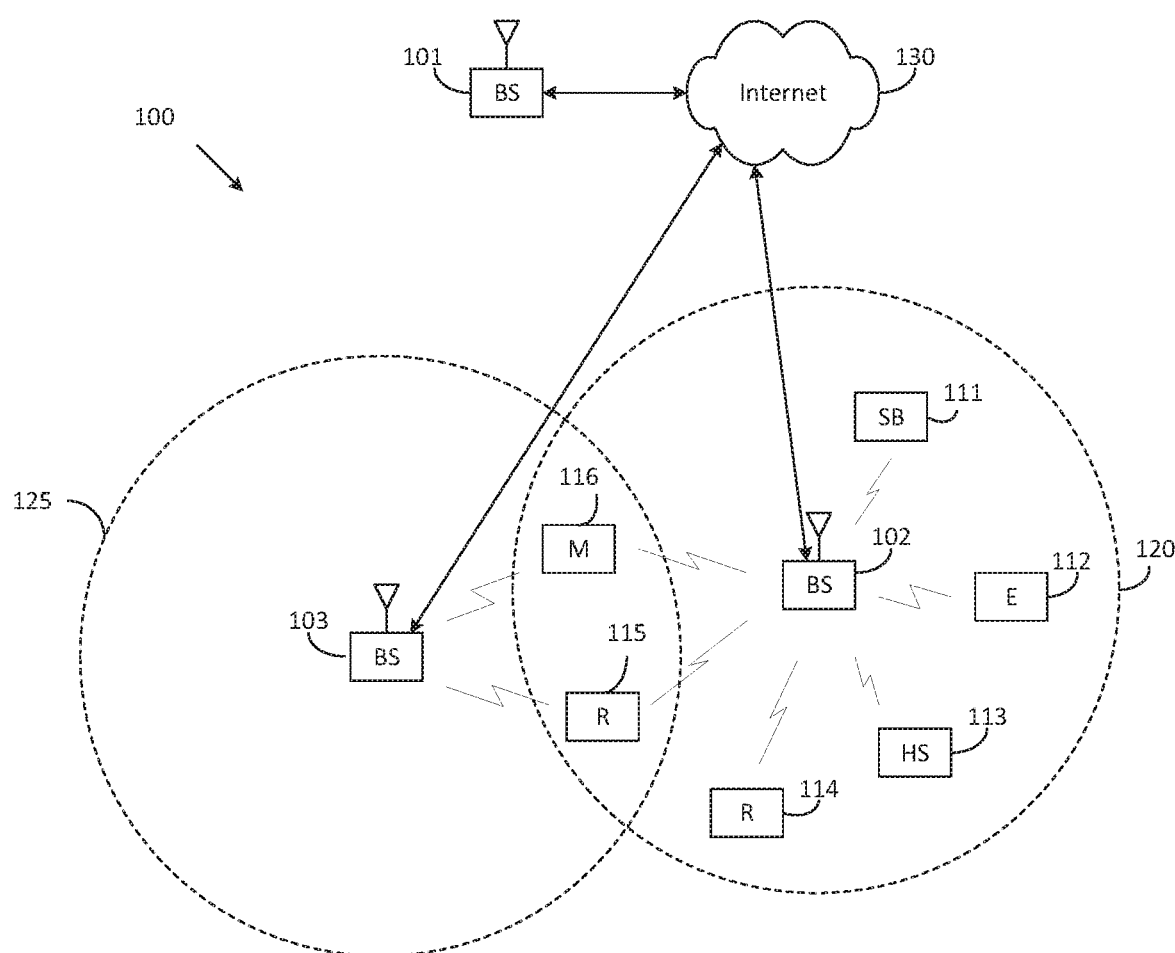
FIG. 1 illustrates an example wireless network according to embodiments of the present disclosure.
Figure 2:
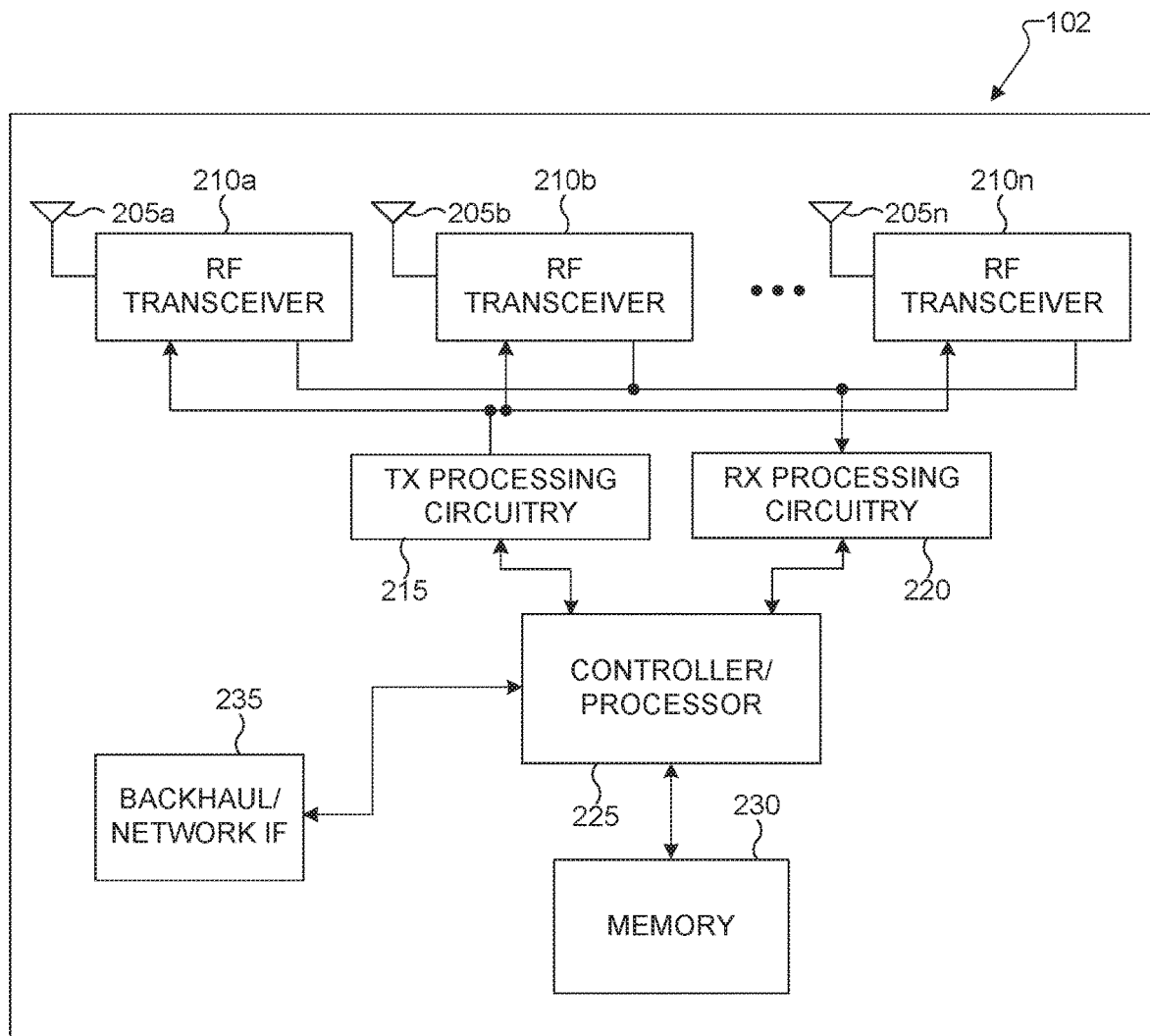
FIG. 2 illustrates an example gNB according to embodiments of the present disclosure.
Figure 3:
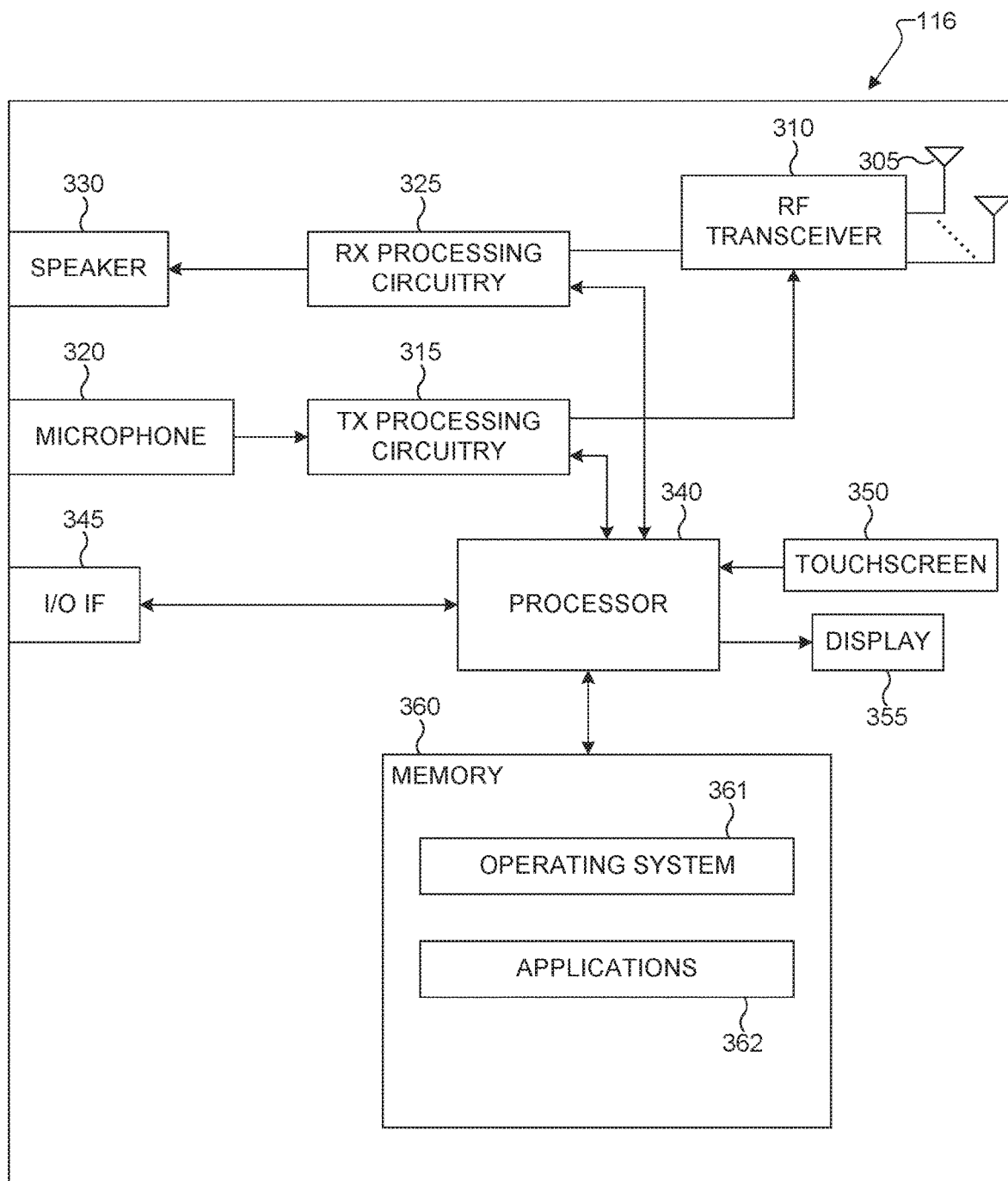
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient CSI-RS enhancement for NR unlicensed spectrum.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TB s) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
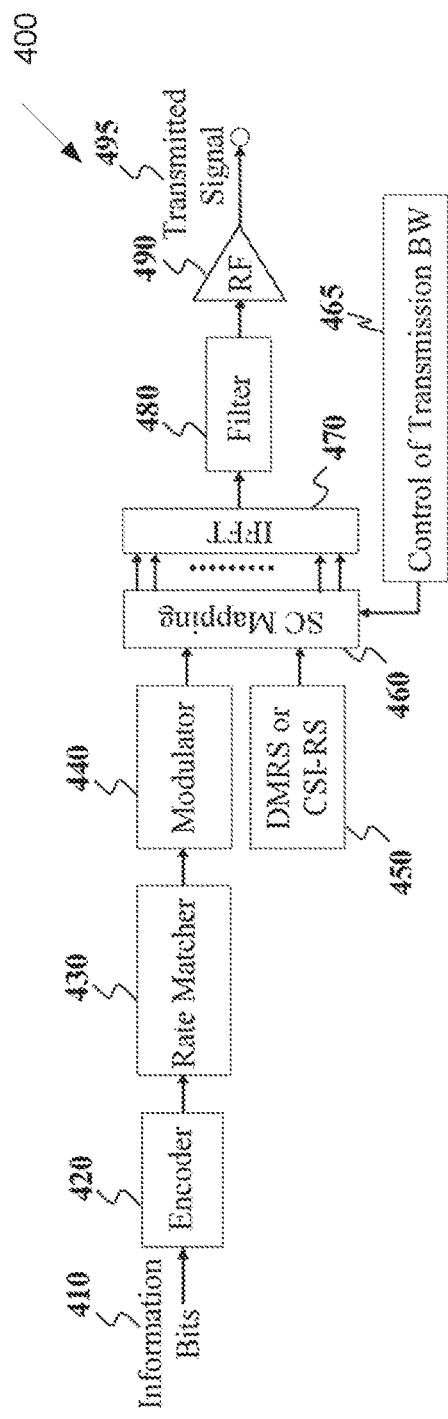
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/ frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by a radio frequency (RF) unit 495.

Figure 5:
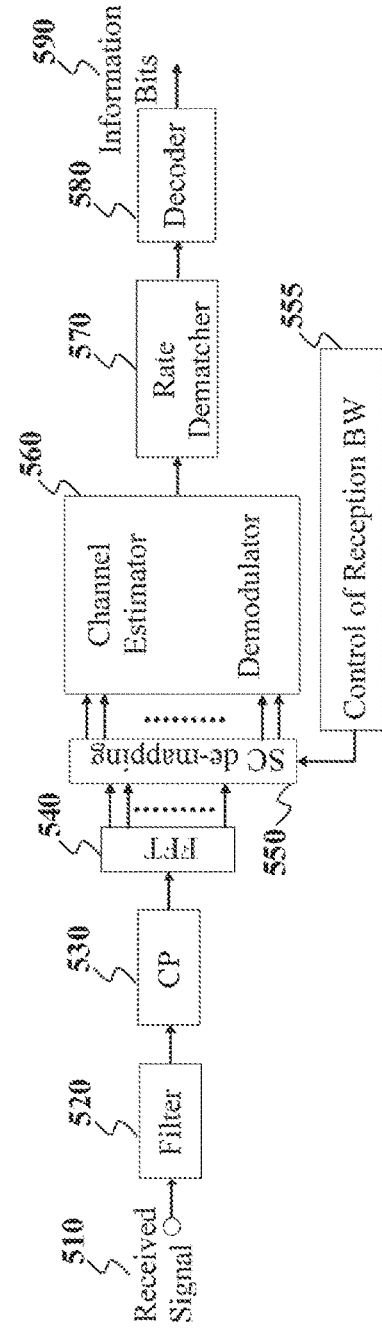
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC) connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
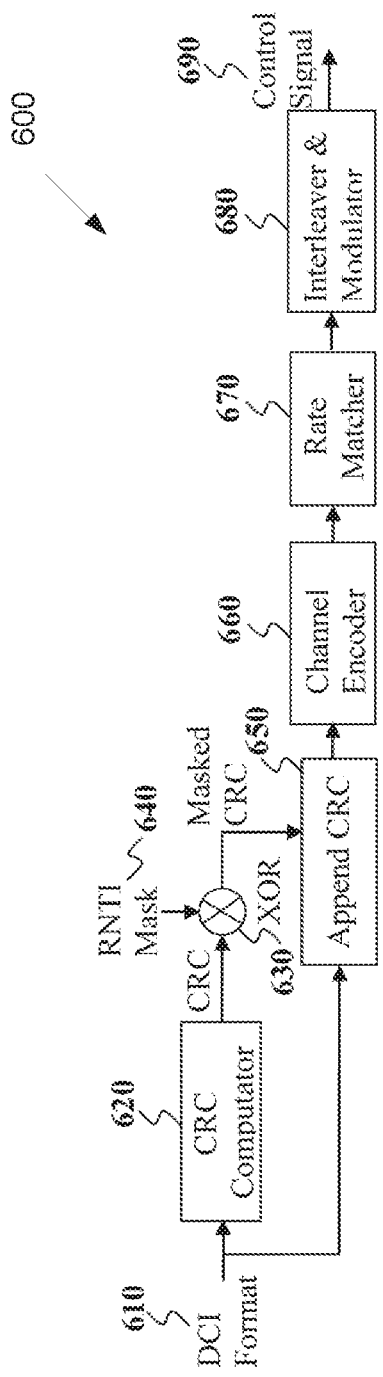
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation unit 630 between CRC bits and RNTI bits 640. The XOR operation is defined as XOR (0, 0)=0, XOR (0, 1)=1, XOR (1, 0)=1, XOR (1, 1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

Figure 7:
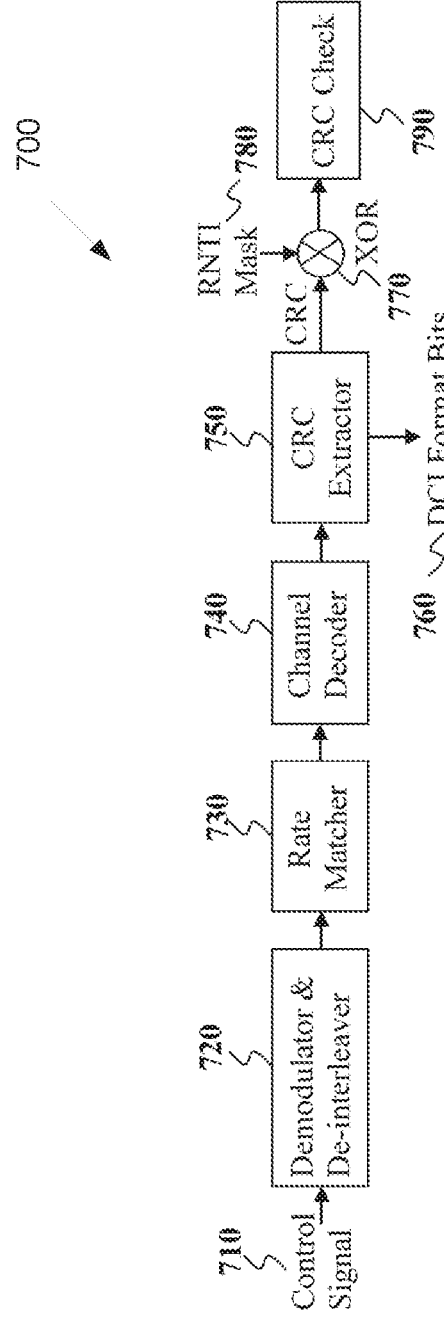
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (checksum is zero), the DCI format information bits are considered to be valid. When the CRC check does not succeed, the DCI format information bits are considered to be invalid.

Figure 8:
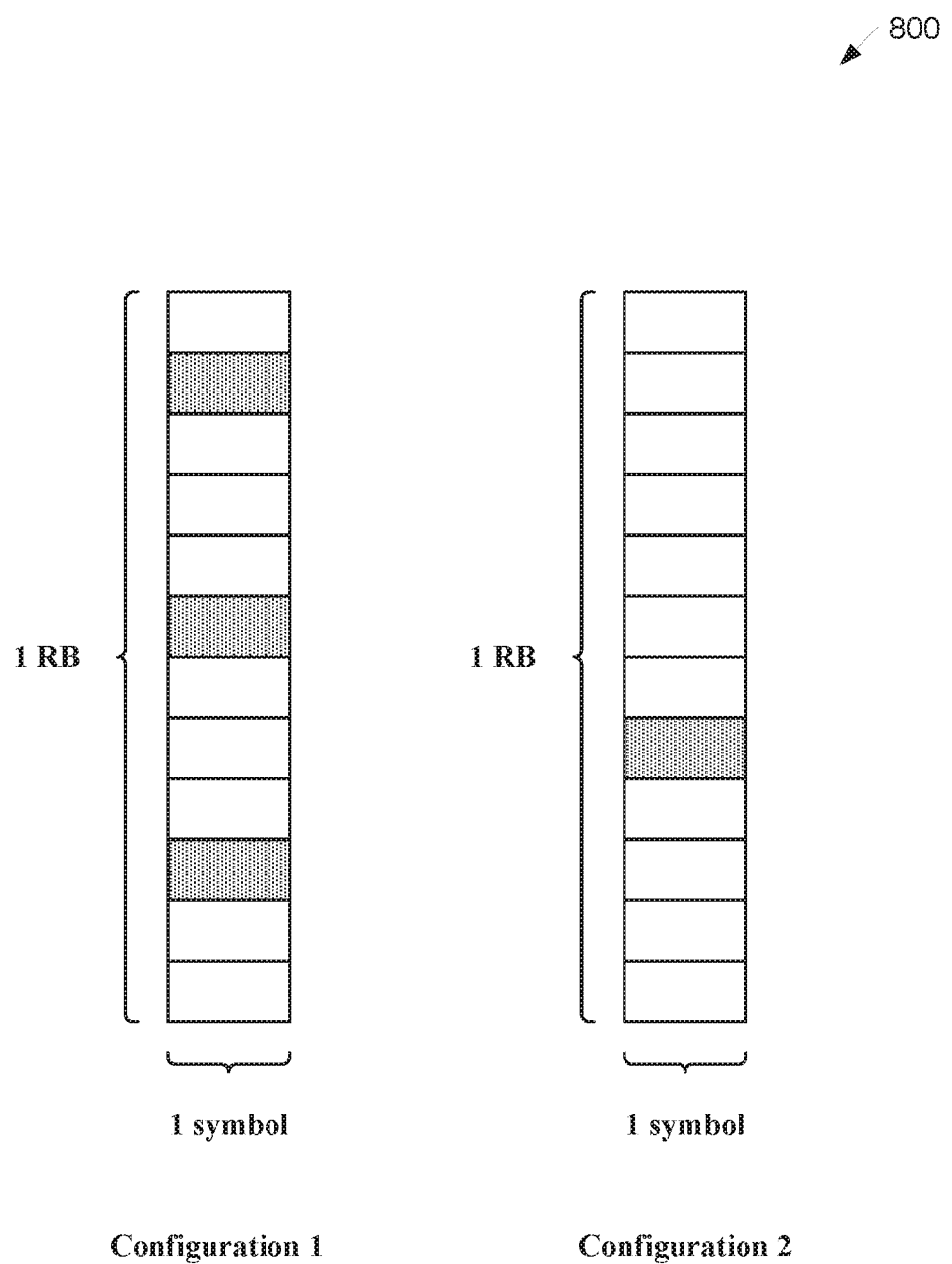
FIG. 8 illustrates an example configuration of CSI-RS for RRM measurement. according to embodiments of the present disclosure.

FIG. 8 illustrates an example configuration of CSI-RS for RRM measurement 800 according to embodiments of the present disclosure. An embodiment of the configuration of CSI-RS for RRM measurement 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

In NR standard specification, NZP CSI-RS can be configured for radio resource management (RRM) measurement, wherein the configuration of CSI-RS is restricted for this purpose. For example, only two configurations of NZP CSI-RS are supported for RRM measurement purpose, and an illustration of the two configurations is shown in FIG. 8.

As illustrated in FIG. 8, both of the configurations contain single OFDM symbol in time domain with full flexibility of location within a slot, and in frequency domain, the configuration 1 has density of 3 REs within an RB with uniformly distributed locations for the 3 REs and flexibly configured location of the starting RE, while the configuration 2 has density of 1 RE within an RB with flexibly configured location of the RE.

In both configurations, the CSI-RS can be associated with a SS/PBCH block, which may be configured with QCL assumption with the CSI-RS. Moreover, in both configurations, the number of RBs configured for CSI-RS for RRM measurement purpose may be restricted to one from {24, 48, 96, 192, 264}, and the starting RB location with respect to a common reference frequency point can be with full flexibility.

For NR-U, CSI-RS can be configured to be part of a discovery burst (DB) (or with an alternatively name e.g., as discovery reference signals (DRS), discovery signals and channels (DSCH), or discovery signals (DS)), then there is a need that the transmission of the CSI-RS and/or configuration of CSI-RS may be enhanced to be consistent with the transmission and/or configuration of SS/PBCH block within the DB.

Meanwhile, because the PDCCH and/or PDSCH of RMSI/OSI/paging can also be part of or be multiplexed with DB, the resource allocation of PDCCH and/or PDSCH of RMSI/OSI/paging may be enhanced to accommodate the transmission of CSI-RS in the same slot.

Moreover, there is a need for indicating the time and frequency domain resource allocation of CSI-RS, such that a UE can perform rate matching based on the indicated the time and frequency domain resource allocation for PDSCH.

Last but not least, there is also a need to support multiple transmission occasions for a CSI-RS resource to accommodate the impact from channel access failures.

In one aspect, the CSI-RS enhancement in this disclosure is applicable to CSI-RS for radio resource management (RRM) measurement. For example, the CSI-RS resource is configured by higher layer parameter CSI-RS-ResourceConfigMobility.

In another aspect, the CSI-RS enhancement in this disclosure is applicable to CSI-RS for radio link monitoring (RLM). For example, the CSI-RS resource is configured by higher layer parameter RadioLinkMonitoringRS.

In one embodiment, a configuration of a CSI-RS resource, wherein the CSI-RS is as a part of a NR-U DB, can be restricted such that the configured time domain and frequency domain resources for CSI-RS are always located within the NR-U DB or NR-U DB transmission window.

In one example, a UE assumes the periodicity of the CSI-RS as a part of a NR-U DB is the same as the periodicity for the transmission of the NR-U DB. In one instance, there is no separate configuration of the periodicity of the CSI-RS as a part of a NR-U DB.

In one example, a UE assumes the periodicity of the CSI-RS as a part of a NR-U DB is configured smaller than or equal to the periodicity for the transmission of NR-U DB, and a UE can assume that there can be CSI-RS configured by the same configuration and transmitted outside the transmission window for NR-U DB.

In one example, a UE assumes the periodicity of the CSI-RS as a part of a NR-U DB is configured larger than or equal to the periodicity for the transmission of NR-U DB, and a UE can assume that there can be no CSI-RS configured for some of the transmission windows for NR-U DB. In one example, there is an indication whether a CSI-RS is configured for a transmission window for NR-U DB.

In one example, a UE assumes that a periodicity of 4 ms is not configured for CSI-RS is as a part of a NR-U DB.

In one example, if a CSI-RS as part of a NR-U DB is configured to be QCLed with a SS/PBCH block in the NR-U DB, a UE assumes that the slot for receiving the CSI-RS is the same as the slot receiving the QCLed SS/PBCH block.

In one example, if a CSI-RS as part of a NR-U DB is configured to a UE, the UE assumes the configured slot receiving CSI-RS is within the NR-U DB transmission window.

In one example, if a CSI-RS as part of a NR-U DB is configured to a UE, the UE does not expect the configured symbol for CSI-RS overlaps in time domain with the symbol(s) configured for CORESET #0 to receive PDCCH for search space set.

In one example, if a CSI-RS as part of a NR-U DB is configured to a UE, the UE does not expect the configured symbol for CSI-RS overlaps in time domain with the symbols for receiving an SS/PBCH block.

In one example, if a CSI-RS as part of a NR-U DB is configured to a UE, and if the configured symbol for CSI-RS overlaps in time domain with the symbols for receiving an SS/PBCH block, the UE expects the RBs configured for CSI-RS do not overlap in frequency domain with RBs for receiving an SS/PBCH block.

In one example, if a CSI-RS as part of a NR-U DB is configured to a UE, and if the configured symbol for CSI-RS overlaps in time domain with the symbols for receiving an SS/PBCH block, the UE expects the CSI-RS is QCLed with the SS/PBCH block.

In one example, if a CSI-RS as part of a NR-U DB is configured to a UE, and if the configured symbol for CSI-RS does not overlap in time domain with the symbols for receiving an SS/PBCH block, the UE expects the CSI-RS is not QCLed with the SS/PBCH block.

In one example, if a CSI-RS as part of a NR-U DB is configured to a UE, and if the configured symbol for CSI-RS overlaps in time domain with the symbols for receiving an SS/PBCH block, the UE expects the symbol for CSI-RS is the same as a symbol mapped for SSS in an SS/PBCH block.

In one example, if a CSI-RS as part of a NR-U DB is configured to a UE, the UE does not expect the configured symbol for CSI-RS overlaps in time domain with the symbol(s) for receiving a DMRS of PDSCH scheduled by PDCCH contained in CORESET #0.

In one example, if a CSI-RS as part of a NR-U DB is configured to a UE, if the configured symbol for CSI-RS overlaps in time domain with the symbol(s) for receiving a DMRS of PDSCH scheduled by PDCCH contained in CORESET #0, the UE expects the REs configured for CSI-RS do not overlap in frequency domain with REs for receiving the DMRS of PDSCH.

In one example, if more than one CSI-RS resources as part of a NR-U DB are configured, the set of symbols configured for CSI-RS within a slot may be same across slots within a DB transmission window.

In one example, a UE assumes that the frequency occupation for a CSI-RS as part of a NR-U DB is within the BWP where the NR-U DB is located. In one example, a UE assumes that the frequency occupation for a CSI-RS as part of a NR-U DB is within the initial active DL BWP, when the initial DL BWP is active.

In one embodiment, there can be a limit on the number of CSI-RS resources configured for NR-U DB.

In another embodiment, there can be a limit on the number of the sets of CSI-RS resources configured for NR-U DB.

In yet another embodiment, there can be a limit on the time and frequency domain resources configured for CSI-RS. In one example, a UE assumes the time domain resources configured for CSI-RS do not exceed 1 symbol per slot. In another example, a UE assumes the time domain resources configured for CSI-RS do not exceed 2 symbol per slot. In yet another example, a UE assumes the time domain resources configured for CSI-RS do not exceed 1 symbol per half slot.

In one embodiment, the density configured for CSI-RS as part of NR-U DB is 3.

In another embodiment, if the configured symbol for CSI-RS overlaps in time domain with the symbols for receiving an SS/PBCH block, the density configured for CSI-RS as part of NR-U DB is 3.

In one embodiment, the symbol index configured for CSI-RS as part of NR-U DB is depending on the SS/PBCH block index or the potential SS/PBCH block index within a DB transmission window.

In one example, the configured symbol index is determined as X if the SS/PBCH block index is even (e.g., the SS/PBCH block is located in the first half of the slot), and the configured symbol index is determined as X+7 if the SS/PBCH block index is odd (e.g., the SS/PBCH block is located in the second half of the slot).

In another example, the configured symbol index is determined as X if the potential SS/PBCH block index within a DB transmission window is even (e.g., the SS/PBCH block is located in the first half of the slot), and the configured symbol index is determined as X+7 if the potential SS/PBCH block index within a DB transmission window is odd (e.g., the SS/PBCH block is located in the second half of the slot).

In yet another example, the configured symbol index is determined as X if the SS/PBCH block index is even (e.g., the SS/PBCH block is located in the first half of the slot), and the configured symbol index is determined as X+6 if the SS/PBCH block index is odd (e.g., the SS/PBCH block is located in the second half of the slot).

In yet another example, the configured symbol index is determined as X if the potential SS/PBCH block index within a DB transmission window is even (e.g., the SS/PBCH block is located in the first half of the slot), and the configured symbol index is determined as X+6 if the potential SS/PBCH block index within a DB transmission window is odd (e.g., the SS/PBCH block is located in the second half of the slot).

In yet another embodiment, when a CSI-RS resource is configured as part of NR-U DB and configured to be associated with a SS/PBCH block (e.g., according to a same QCL assumption), the UE assumes the CSI-RS and associated SS/PBCH block are transmitted in the same slot.

In one embodiment, a gNB has to transmit a CSI-RS as part of a NR-U DB according to the time domain resource determined based on the configuration of the CSI-RS as part of a NR-U DB, and a UE only expect to receive the CSI-RS according to the time domain resource determined based on the configuration of the CSI-RS as part of a NR-U DB. If part of the NR-U DB is not transmitted due to failed LBT, the gNB may not transmit the same CSI-RS in other time location, and the UE does not expect to receive the CSI-RS in other time location.

In another embodiment, a gNB has a planned time location to transmit a CSI-RS as part of a NR-U DB, wherein the planned location is according to the time domain resource determined based on the configuration of the CSI-RS as part of a NR-U DB, and if part of the NR-U DB or the whole NR-U DB is not transmitted on the planned time location due to failed LBT, the gNB can attempt to transmit the part of the NR-U DB or the whole NR-U DB, not on the planned time location, on another time location within the DB transmission window.

In such embodiment, for one configured CSI-RS resource, a UE may expect at least one or multiple time locations for receiving the CSI-RS as part of a NR-U DB, wherein one of the at least one or multiple time locations is according to the time domain resource determined based on the configuration of the CSI-RS as part of a NR-U DB, and the remaining ones can be determined by the UE based on indication or predefined time interval(s) from the planned time location.

In one example, a gNB configure a CSI-RS resource which corresponds to at least one potential transmission locations from the gNB perspective, and at least one reception/detection/measurement locations from the UE perspective.

In another example, the UE assumes that the CSI-RS in the at least one reception/detection/measurement locations is QCLed.

In yet another example, a UE assumes there is at most one CSI-RS received/detected/measured in the group of QCLed at least one reception/detection/measurement locations. For example, if the UE received/detected/measured one CSI-RS in one of the at least one reception/detection/measurement locations, the UE expects that no CSI-RS is transmitted in the remaining reception/detection/measurement locations.

In yet another example, if the UE received/detected/measured any other signal/channel (e.g., associated SS/PBCH block in the same slot) in the same slot with the CSI-RS reception/detection/measurement location, the UE assumes the CSI-RS exists and is transmitted by the gNB in that slot.

Figure 9:
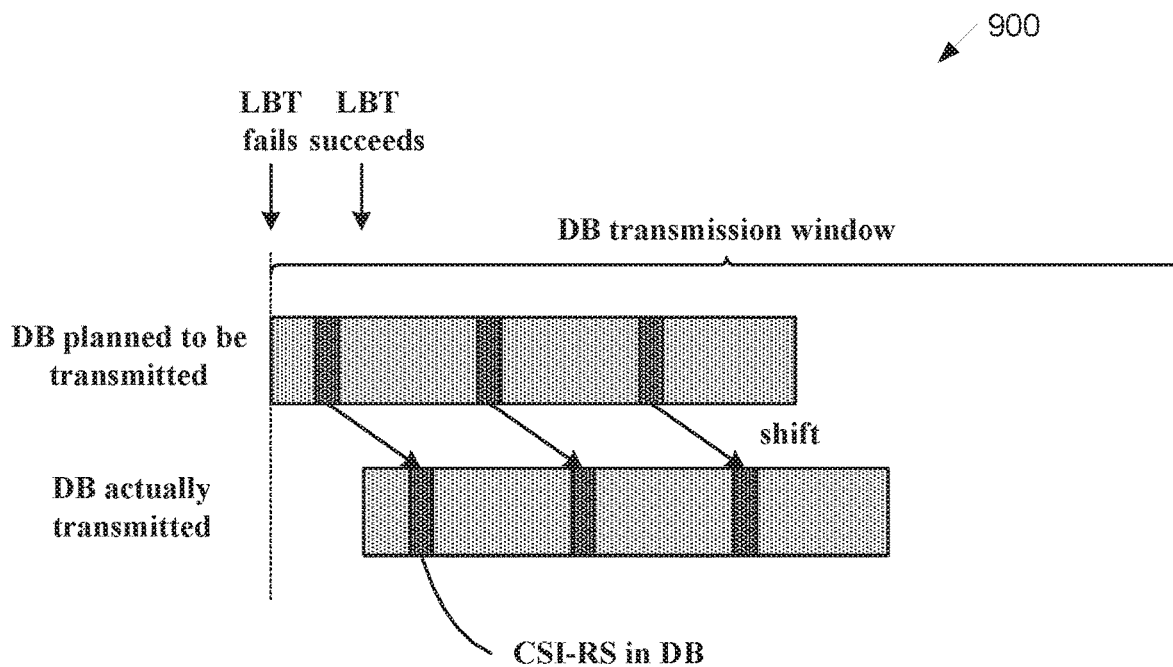
FIG. 9 illustrates an example shifted CSI-RS transmission with NR-U DB according to embodiments of the present disclosure.

FIG. 9 illustrates an example shifted CSI-RS transmission with NR-U DB 900 according to embodiments of the present disclosure. An embodiment of the shifted CSI-RS transmission with NR-U DB 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

In one example, the whole NR-U DB can be shifted to start at a different time location from the planned time location according to the time domain resource determined based on the configuration of the CSI-RS as part of a NR-U DB, wherein the different time location can be determined based on a timing when LBT succeeds, and the CSI-RS as part of a NR-U DB is shifted together with the whole NR-U DB. An illustration of this approach is shown in FIG. 9.

In one example, a part of the NR-U DB or the whole NR-U DB may fail to be transmitted at the planned time location, and part of the NR-U DB or the whole NR-U DB failed to be transmitted can be transmitted later in the same DB transmission window (e.g., in a wrapped-around manner). In one example, for this approach, some of the CSI-RS configured in the NR-U DB may still be able to transmitted at the planned time location, if only part of the NR-U DB fails to be transmitted at the planned time location.

Figure 10A:
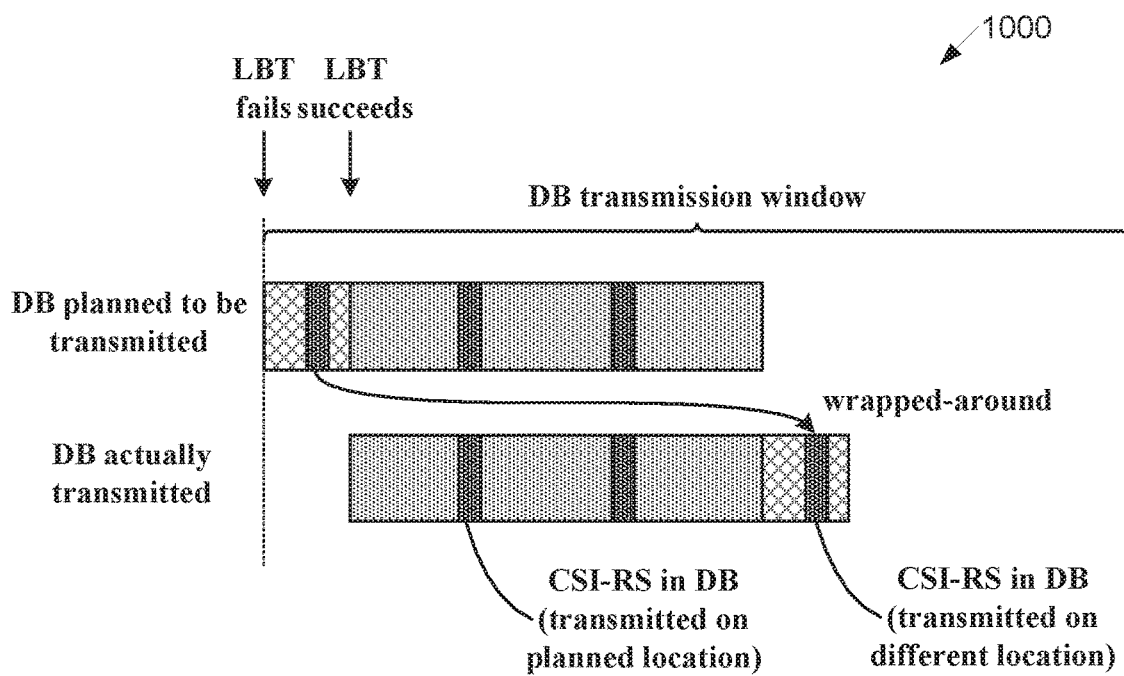
FIG. 10A illustrates an example wrapped-around CSI-RS transmission within NR-U DB according to embodiments of the present disclosure.

FIG. 10A illustrates an example wrapped-around CSI-RS transmission within NR-U DB 1000 according to embodiments of the present disclosure. An embodiment of the wrapped-around CSI-RS transmission within NR-U DB 1000 shown in FIG. 10A is for illustration only. One or more of the components illustrated in FIG. 10A can be implemented in specialized circuitry configured to perform the noted functions or one or more of the components can be implemented by one or more processors executing instructions to perform the noted functions. Other embodiments are used without departing from the scope of the present disclosure.

In another example, for this approach, some of the CSI-RS configured in the NR-U DB may be transmitted at a different time location from the corresponding planned time location determined based on the configuration of the CSI-RS. An illustration of this approach is shown in FIG. 10A.

In one example, a CSI-RS as part of NR-U DB is transmitted in a different time location within the DB transmission window only when the CSI-RS is configured to be associated with an SS/PBCH block within the DB. For one example, the CSI-RS is configured and transmitted in the same slot as the associated SS/PBCH block, if the transmission of SS/PBCH block is allowed in a different and later time location.

In one example, a CSI-RS as part of NR-U DB is transmitted in a different time location within the DB transmission window only when the CSI-RS is configured to be associated and QCLed with an SS/PBCH block within the DB. For one example, the CSI-RS is configured and transmitted in the same slot as the associated and QCLed SS/PBCH block, if the transmission of SS/PBCH block is allowed in a different and later time location.

In one example, the wrapped-around manner of transmission can be interpreted as a QCL assumption from the UE perspective, and this QCL assumption parameter for CSI-RS is associated with the QCL assumption parameter for SS/PBCH block. For example, a UE assumes a QCL assumption parameter $N_{SSB}^{QCL}$ such that the SS/PBCH blocks with same value of $(N_{DM-RS}^{PBCH} \mod N_{SSB}^{QCL})$ within and across DB transmission window(s) are assumed to be QCLed, where $N_{DM-RS}^{PBCH}$ is the index of DM-RS sequence of PBCH in the SS/PBCH block.

In one example for $N_{SSB}^{QCL}$ is 2 or 4 or 8, the potential locations for transmitting a CSI-RS resource are the slots within a DB transmission window with a slot index satisfying $(\bar{n}_{s,f}^{\mu} \mod (N_{SSB}^{QCL}/2))=n_{offset}$, where $\bar{n}_{s,f}^{\mu}$ is the slot index within the DB transmission window and $n_{offset}$ is obtained from the configured slot offset for the CSI-RS resource within the DB transmission window, and the symbol index for CSI-RS is the same as the configured symbol index for CSI-RS resource within all the potential slots for CSI-RS transmission.

In one example, a UE can assume that $n_{offset} \leq N_{SSB}^{QCL}/2-1$. In another aspect, $\bar{n}_{s,f}^{\mu}=n_{s,f}^{\mu}$, if $n_{s,f}^{\mu} \leq N_{slot}^{frame,\mu}/2-1$, and $\bar{n}_{s,f}^{\mu}=n_{s,f}^{\mu}-N_{slot}^{frame,\mu}/2$, if $n_{s,f}^{\mu}>N_{slot}^{frame,\mu}/2-1$, wherein $n_{s,f}^{\mu}$ is the slot index within a frame, and $N_{slot}^{frame,\mu}$ is the number of slots in a frame.

In another example for $N_{SSB}^{QCL}$ is 1, the potential locations for transmitting a CSI-RS resource are all the slots within a DB transmission window, and the symbol index for CSI-RS is the same as the configured symbol index for CSI-RS resource within all the potential slots for CSI-RS transmission. This example can be combined with the example for $N_{SSB}^{QCL}$ being 2 or 4 or 8, such that the potential locations for transmitting a CSI-RS resource are the slots within a DB transmission window with a slot index satisfying $(\bar{n}_{s,f}^{\mu} \bmod \max((N_{SSB}^{QCL}/2))=n_{offset}$, where $\bar{n}_{s,f}^{\mu}$ is the slot index within the DB transmission window and $n_{offset}$ is obtained from the configured slot offset for the CSI-RS resource within the DB transmission window, and the symbol index for CSI-RS is the same as the configured symbol index for CSI-RS resource within all the potential slots for CSI-RS transmission. In one example, a UE can assume that $n_{offset} \leq N_{SSB}^{QCL}/2 - 1$. In another aspect, $\bar{n}_{s,f}^{\mu} = n_{s,f}^{\mu}$, if $n_{s,f}^{\mu} \leq N_{slot}^{frame,\mu}/2 - 1$, and $\bar{n}_{s,f}^{\mu} = n_{s,f}^{\mu} - N_{slot}^{frame,\mu}/2$, if $n_{s,f}^{\mu} > N_{slot}^{frame,\mu}/2 - 1$, wherein $n_{s,f}^{\mu}$ is the slot index within a frame, and $N_{slot}^{frame,\mu}$ is the number of slots in a frame.

In one example of $N_{SSB}^{QCL}$ is 1, the potential locations for transmitting a CSI-RS resource are all the half slots within a DB transmission window. In one sub-example, the symbol index for CSI-RS is the same for CSI-RS resource within all the potential half slots for CSI-RS transmission. In another sub-example, the first symbol index for CSI-RS is the same for CSI-RS resource within all the potential first half slots for CSI-RS transmission, and the second symbol index for CSI-RS is the same for CSI-RS resource within all the potential second half slots for CSI-RS transmission, wherein the first and second symbol index have a one-to-one mapping relationship.

Figure 10B:
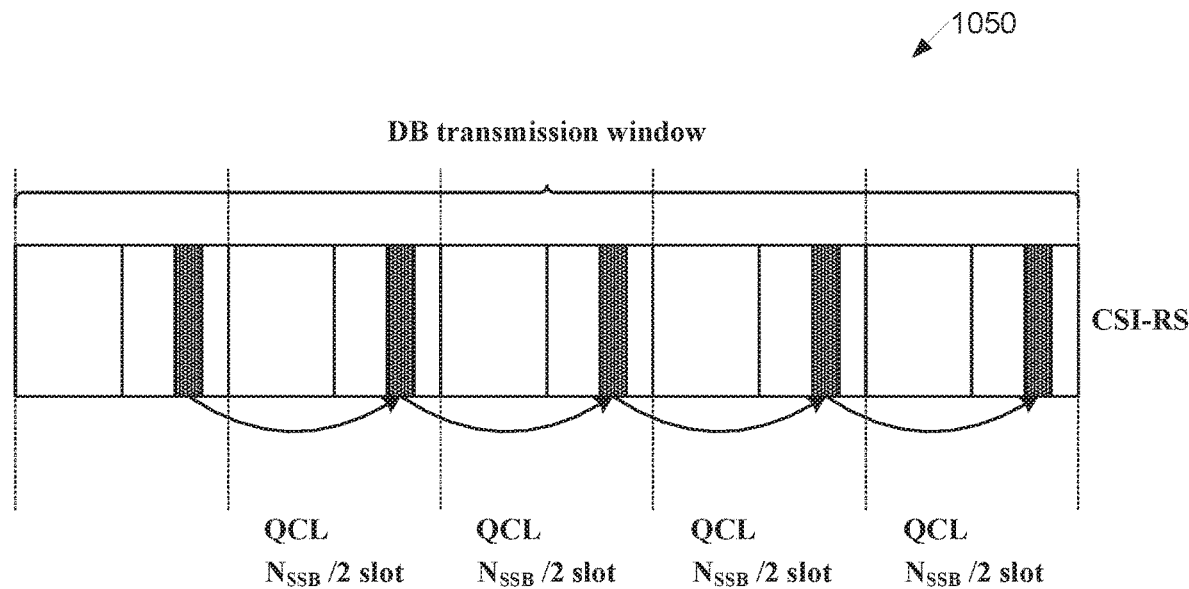
FIG. 10B illustrates an example QCL assumption for potential transmission locations of CSI-RS in NR-U DB according to embodiments of the present disclosure.

FIG. 10B illustrates an example QCL assumption for potential transmission locations of CSI-RS in NR-U DB 1050 according to embodiments of the present disclosure. An embodiment of the QCL assumption for potential transmission locations of CSI-RS in NR-U DB 1050 shown in FIG. 10B is for illustration only. One or more of the components illustrated in FIG. 10B can be implemented in specialized circuitry configured to perform the noted functions or one or more of the components can be implemented by one or more processors executing instructions to perform the noted functions. Other embodiments are used without departing from the scope of the present disclosure.

In the aforementioned examples, from a UE perspective, a UE assumes the potential locations for transmitting a CSI-RS resources are QCLed. An illustration of this consideration is shown in FIG. 10B.

In one example, the wrapped-around manner of transmission can be interpreted as a QCL assumption from the UE perspective, and the QCL assumption parameter for CSI-RS is configured by the gNB (e.g., denoted as $N_{CSI-RS}^{QCL}$). For example, the potential locations for transmitting a CSI-RS resource are the slots within a DB transmission window with slot index satisfying $(\bar{n}_{s,f}^{\mu} \bmod N_{CSI-RS}^{QCL}) = n_{offset}$, where $\bar{n}_{s,f}^{\mu}$ is the slot index within the DB transmission window and $n_{offset}$ is obtained from the configured slot offset for the CSI-RS resource within the DB transmission window, and the symbol index for CSI-RS is the same as the configured symbol index for CSI-RS resource within all the potential slots for CSI-RS transmission.

In one example, a UE can assume that $n_{offset} \leq N_{CSI-RS}^{QCL} - 1$. In another aspect, $\bar{n}_{s,f}^{\mu} = n_{s,f}^{\mu}$, if $n_{s,f}^{\mu} \leq N_{slot}^{frame,\mu}/2 - 1$, and $\bar{n}_{s,f}^{\mu} = n_{s,f}^{\mu} - N_{slot}^{frame,\mu}/2$, if $n_{s,f}^{\mu} > N_{slot}^{frame,\mu}/2 - 1$, wherein $n_{s,f}^{\mu}$ is the slot index within a frame, and $N_{slot}^{frame,\mu}$ is the number of slots in a frame. From a UE perspective, a UE assumes the potential locations for transmitting a CSI-RS resources are QCLed. An illustration of this consideration is shown in FIG. 10C.

Figure 10C:
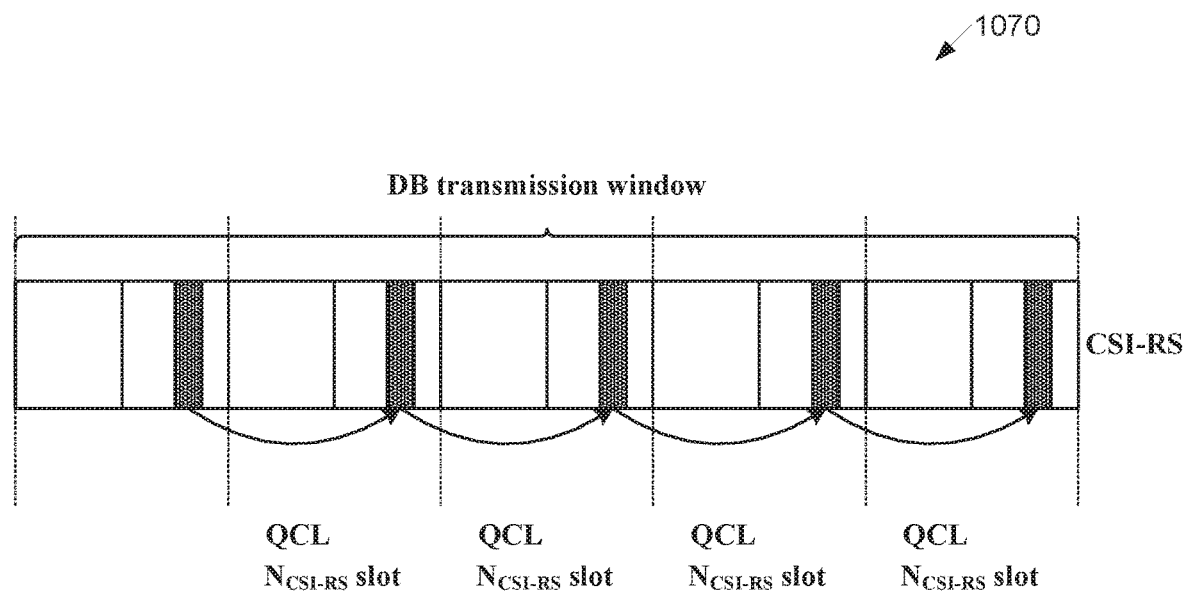
FIG. 10C illustrates an QCL assumption for potential transmission locations of CSI-RS in NR-U DB according to embodiments of the present disclosure.

FIG. 10C illustrates an QCL assumption for potential transmission locations of CSI-RS in NR-U DB 1070 according to embodiments of the present disclosure. An embodiment of the QCL assumption for potential transmission locations of CSI-RS in NR-U DB 1070 shown in FIG. 10C is for illustration only. One or more of the components illustrated in FIG. 10C can be implemented in specialized circuitry configured to perform the noted functions or one or more of the components can be implemented by one or more processors executing instructions to perform the noted functions. Other embodiments are used without departing from the scope of the present disclosure.

In one embodiment, for a CSI-RS as part of NR-U DB, the sequence generation for CSI-RS is the same within the DB transmission window, regardless of the symbol index within a slot or the slot index is the CSI-RS configured with.

In one example, the sequence generation is not depending on the slot index within a radio fame nor the OFDM symbol index within a slot, for example, the PN-sequence generator for CSI-RS may be initialized with $c_{init} = (2^{10}(2 \cdot n_{ID}+1)+n_{ID})$ mod $2^{31}$ at the start of each OFDM symbol, where $n_{ID}$ is ID for generating the CSI-RS. In this example, the CSI-RS sequence is the same for any time instance.

In one example, the sequence generation is only depending on the half frame index within a radio frame, and not depending on the OFDM symbol index within a slot, e.g., the PN-sequence generator for CSI-RS may be initialized with $c_{init} = (2^{10}(N_{symb}^{slot}(N_{slot}^{frame,\mu}/2)\lfloor n_{s,f}^{\mu}/(N_{slot}^{frame,\mu}/2)\rfloor + 1)(2 \cdot n_{ID}+1)+n_{ID})$ mod $2^{31}$ at the start of each OFDM symbol, where $n_{ID}$ is ID for generating the CSI-RS, $N_{slot}^{frame,\mu}$ is the number of slots within a frame with respect to numerology $\mu$, $N_{symb}^{slot}$ is the number of symbols within a slot, $n_{s,f}^{\mu}$ is the slot number within a radio frame. In such example, the CSI-RS sequence is the same within a half frame.

In one embodiment, for a CSI-RS as part of NR-U DB, the sequence generation for CSI-RS is the same for a given OFDM symbol location within the DB transmission window, regardless of the slot index is the CSI-RS configured with.

In one example, the sequence generation is not depending on the slot index within a radio fame (e.g., equivalently as setting the slot index to 0), but depending on the OFDM symbol index within a slot, for example, the PN-sequence generator for CSI-RS may be initialized with $c_{init} = (2^{10}(l+1)(2 \cdot n_{ID}+1)+n_{ID})$ mod $2^{31}$ at the start of each OFDM symbol, where $n_{ID}$ is ID for generating the CSI-RS, and l is the OFDM symbol number within a slot. In this example, CSI-RS sequence is the same if the symbol index is the same.

In one example, the sequence generation is only depending on the half frame index within a radio frame, and depending on the OFDM symbol index within a slot, for example, the PN-sequence generator for CSI-RS may be initialized with $c_{init} = (2^{10}(N_{symb}^{slot}(N_{slot}^{frame,\mu}/2)\lfloor n_{s,f}^{\mu}/(N_{slot}^{frame,\mu}/2)\rfloor + l+1)(2 \cdot n_{ID}+1)+n_{ID})$ mod $2^{31}$ at the start of each OFDM symbol, where $n_{ID}$ is ID for generating the CSI-RS, $N_{slot}^{frame,\mu}$ is the number of slots within a frame with respect to numerology $\mu$, $N_{symb}^{slot}$ is the number of symbols within a slot, $n_{s,f}^{\mu}$ is the slot number within a radio frame, and l is the OFDM symbol number within a slot. In this example, the CSI-RS sequence is the same within a half frame, if the symbol index is the same.

In one embodiment, for a CSI-RS as part of NR-U DB, the sequence generation for CSI-RS is based on the relative timing within the DB transmission window.

In one example, the sequence generation is depending on the slot index within the DB transmission window, and depending on the OFDM symbol index within a slot, for example, the PN-sequence generator for CSI-RS may be initialized with $c_{init} = (2^{10}(N_{symb}^{slot}\bar{n}_{s,f}^{\mu}+l+1)(2 \cdot n_{ID}+1)+n_{ID})$ mod $2^{31}$ at the start of each OFDM symbol, where $n_{ID}$ is ID for generating the CSI-RS, $N_{symb}^{slot}$ is the number of symbols within a slot, $\bar{n}_{s,f}^{\mu}$ is the slot number within a DB transmission window, and l is the OFDM symbol number within a slot. In one aspect, $\bar{n}_{s,f}^{\mu} = n_{s,f}^{\mu}$, if $n_{s,f}^{\mu} \leq N_{slot}^{frame,\mu}/2-1$, and $\bar{n}_{s,f}^{\mu} = n_{s,f}^{\mu} - N_{slot}^{frame,\mu}/2$, if $n_{s,f}^{\mu} > N_{slot}^{frame,\mu}/2-1$, wherein $n_{s,f}^{\mu}$ is the slot index within a frame, and $N_{slot}^{frame,\mu}$ is the number of slots in a frame.

In one embodiment, the sequence generation is depending on the slot index and OFDM symbol index determined based on the configuration of CSI-RS as part of NR-U DB (e.g., the planned slot index and OFDM symbol index for transmission), even though the slot index and OFDM symbol index for actual transmission of the CSI-RS can be different from the planned ones (e.g., due to LBT). A UE assumes the same CSI-RS sequence is transmitted, wherein the CSI-RS sequence is generated based on the configuration of CSI-RS as part of NR-U DB (e.g., the planned slot index and OFDM symbol index for transmission), at all potential time locations for the CSI-RS within the DB transmission window.

For one example, the sequence generation is depending on the slot index with a modulo operation, and depending on the OFDM symbol index within the slot, e.g., the PN-sequence generator for CSI-RS may be initialized with $c_{init} = (2^{10}(N_{symb}^{slot}\bar{n}_{s,f}^{\mu}+l+1)(2 \cdot n_{ID}+1)+n_{ID})$ mod $2^{31}$ at the start of each OFDM symbol, where $n_{ID}$ is ID for generating the CSI-RS, $N_{symb}^{slot}$ is the number of symbols within a slot, and l is the OFDM symbol number within a slot.

In one sub-example, $\bar{n}_{s,f}^{\mu} = (\bar{n}_{s,f}^{\mu}$ mod $(N_{SSB}^{QCL}/2))$ for $N_{SSB}^{QCL}=2$, or 4 or 8, and $\bar{n}_{s,f}^{\mu}=0$ for $N_{SSB}^{QCL}=1$, where $\bar{n}_{s,f}^{\mu}=n_{s,f}^{\mu}$, if $n_{s,f}^{\mu} \leq n_{slot}^{frame,\mu}/2-1$, and $\bar{n}_{s,f}^{\mu}=n_{s,f}^{\mu}-N_{slot}^{frame,\mu}/2$, if $n_{s,f}^{\mu} > N_{slot}^{frame,\mu}/2-1$, wherein $n_{s,f}^{\mu}$ is the slot index within a frame, and $N_{slot}^{frame,\mu}$ is the number of slots in a frame. Note that the sub-example is same as $\bar{n}_{s,f}^{\mu} = (\bar{n}_{s,f}^{\mu}$ mod max $((N_{SSB}^{QCL}/2),1))$.

In another sub-example, $\bar{n}_{s,f}^{\mu} = (n_{s,f}^{\mu}$ mod $(N_{SSB}^{QCL}/2))$ for $N_{SSB}^{QCL}=2$ or 4 or 8, and $\bar{n}_{s,f}^{\mu}=0$ for $N_{SSB}^{QCL}=1$, where $n_{s,f}^{\mu}$ is the slot index within a frame, and $N_{slot}^{frame,\mu}$ is the number of slots in a frame. Note that the sub-example is same as $\bar{n}_{s,f}^{\mu} = (n_{s,f}^{\mu}$ mod max $((N_{SSB}^{QCL}/2),1))$.

In yet another sub-example, $\bar{n}_{s,f}^{\mu} = (\bar{n}_{s,f}^{\mu}$ mod $N_{CSI-RS}^{QCL})$, where $\bar{n}_{s,f}^{\mu}=n_{s,f}^{\mu}$, if $n_{s,f}^{\mu} \leq N_{slot}^{frame,\mu}/2$, and $\bar{n}_{s,f}^{\mu}=n_{s,f}^{\mu}-N_{slot}^{frame,\mu}/2$, if $n_{s,f}^{\mu} > N_{slot}^{frame,\mu}/2-1$, wherein $n_{s,f}^{\mu}$ is the slot index within a frame, $N_{slot}^{frame,\mu}$ is the number of slots in a frame, and $N_{CSI-RS}^{QCL}$ is the configured QCL assumption parameter for CSI-RS.

In yet another sub-example, $\bar{n}_{s,f}^{\mu} = (n_{s,f}^{\mu}$ mod $N_{CSI-RS}^{QCL})$ where $n_{s,f}^{\mu}$ is the slot index within a frame, and $N_{CSI-RS}^{QCL}$ is the configured QCL assumption parameter for CSI-RS.

In yet another embodiment, the sequence generation is depending on the slot index and OFDM symbol index wherein the CSI-RS as part of NR-U DB is actually transmitted (e.g., may be different from the planned slot index and OFDM symbol index determined based on the configuration of CSI-RS), even though the slot index and OFDM symbol index for actual transmission of the CSI-RS can be different from the planned ones (e.g., due to LBT).

A UE assumes different CSI-RS sequence is transmitted, wherein the CSI-RS sequence is generated based on the slot index and OFDM symbol index for the time location at which CSI-RS is actually transmitted, at all potential time locations for the CSI-RS within the DB transmission window.

In one embodiment, there can be an indication in PBCH payload (e.g., MIB) on whether or not there is a set of CSI-RS resources configured for the NR-U DB.

In one example, if a PBCH payload indicates there is a set of CSI-RS resources configured for the NR-U DB, the time domain and frequency domain resources configured for CSI-RS are common for all the slots within the NR-U DB. In one example, a pattern for time and frequency domain resources for CSI-RS is predefined.

In another embodiment, there can be an indication in PBCH payload (e.g., MIB) on triggering one of the sets of CSI-RS resources. For example, if 2 bits in the PBCH payload are utilized for triggering one of the sets of CSI-RS resources, TABLE 1 can be utilized. For another example, if 3 bits in the PBCH payload are utilized for triggering one of the sets of CSI-RS resources, TABLE 2 can be utilized.

TABLE 1

Example of configuration in PBCH payload on triggering sets of CSI-RS resources

| Value of 2-bit field in PBCH payload | Indication |
|---|---|
| 0 | No CSI-RS configured |
| 1 | Set #1 of CSI-RS resources are configured |
| 2 | Set #2 of CSI-RS resources are configured |
| 3 | Set #3 of CSI-RS resources are configured |

TABLE 2

Example of configuration in PBCH payload on triggering sets of CSI-RS resources

| Value of 3-bit field in PBCH payload | Indication |
|---|---|
| 0 | No CSI-RS configured |
| 1 | Set #1 of CSI-RS resources are configured |
| 2 | Set #2 of CSI-RS resources are configured |
| 3 | Set #3 of CSI-RS resources are configured |
| 4 | Set #4 of CSI-RS resources are configured |
| 5 | Set #5 of CSI-RS resources are configured |
| 6 | Set #6 of CSI-RS resources are configured |
| 7 | Set #7 of CSI-RS resources are configured |

In one example, if a PBCH payload indicates a set of CSI-RS resources configured for the NR-U DB, the time domain and frequency domain resources configured for CSI-RS within the set are common for all the slots within the NR-U DB. In one example, for each set of CSI-RS resources, a pattern for time and frequency domain resources for CSI-RS is associated.

In yet another embodiment, there can be an indication in PBCH payload (e.g., MIB) on one configuration of CSI-RS resources. For example, if 2 bits in the PBCH payload are utilized for indicating one configuration of CSI-RS resources, TABLE 3 can be utilized. For another example, if 3 bits in the PBCH payload are utilized for indicating one configuration of CSI-RS resources, TABLE 4 can be utilized.

TABLE 3

Example of configuration in PBCH payload on indicating a configuration of CSI-RS resources

| Value of 2-bit field in PBCH payload | Indication |
|---|---|
| 0 | No CSI-RS configured |
| 1 | Configuration #1 of CSI-RS resources |
| 2 | Configuration #2 of CSI-RS resources |
| 3 | Configuration #3 of CSI-RS resources |

TABLE 4

Example of configuration in PBCH payload on indicating a configuration of CSI-RS resources

| Value of 3-bit field in PBCH payload | Indication |
| --- | --- |
| 0 | No CSI-RS configured |
| 1 | Configuration #1 of CSI-RS resources |
| 2 | Configuration #2 of CSI-RS resources |
| 3 | Configuration #3 of CSI-RS resources |
| 4 | Configuration #4 of CSI-RS resources |
| 5 | Configuration #5 of CSI-RS resources |
| 6 | Configuration #6 of CSI-RS resources |
| 7 | Configuration #7 of CSI-RS resources |

In one example, if a PBCH payload indicates a configuration of CSI-RS resources for the NR-U DB, the time domain and frequency domain resources configured for CSI-RS are common for all the slots within the NR-U DB. In one example, a pattern for time and frequency domain resources for CSI-RS is included in a configuration of CSI-RS resources for the NR-U DB.

In yet another embodiment, there can be an indication in PBCH payload (e.g., MIB) on triggering one of the patterns for time and frequency domain resources for CSI-RS. For example, if 2 bits in the PBCH payload are utilized for triggering one of the patterns for time and frequency domain resources for CSI-RS, TABLE 5 can be utilized. For another example, if 3 bits in the PBCH payload are utilized for triggering one of the patterns for time and frequency domain resources for CSI-RS, TABLE 6 can be utilized.

TABLE 5

Example of configuration in PBCH payload on triggering sets of CSI-RS resources

| Value of 2-bit field in PBCH payload | Indication |
| --- | --- |
| 0 | No CSI-RS configured |
| 1 | Pattern #1 for time and frequency domain resources for CSI-RS |
| 2 | Pattern #2 for time and frequency domain resources for CSI-RS |
| 3 | Pattern #3 for time and frequency domain resources for CSI-RS |

TABLE 6

Example of configuration in PBCH payload on triggering sets of CSI-RS resources

| Value of 3-bit field in PBCH payload | Indication |
| --- | --- |
| 0 | No CSI-RS configured |
| 1 | Pattern #1 for time and frequency domain resources for CSI-RS |
| 2 | Pattern #2 for time and frequency domain resources for CSI-RS |
| 3 | Pattern #3 for time and frequency domain resources for CSI-RS |
| 4 | Pattern #4 for time and frequency domain resources for CSI-RS |
| 5 | Pattern #5 for time and frequency domain resources for CSI-RS |
| 6 | Pattern #6 for time and frequency domain resources for CSI-RS |
| 7 | Pattern #7 for time and frequency domain resources for CSI-RS |

In one embodiment, there can be an indication in a DCI format scheduling PDSCH of RMSI on whether or not there is a set of CSI-RS resources configured within the same slot as the PDSCH of RMSI. For example, the DCI format is Format 1_0.

In one example, if the DCI format scheduling PDSCH of RMSI indicates there is a set of CSI-RS resources configured within the same slot as the PDSCH of RMSI, the time domain and frequency domain resources configured for CSI-RS in the slot are assumed to be same as the ones configured for CSI-RS in other slots within the NR-U DB. In one example, a pattern for time and frequency domain resources for CSI-RS is predefined for the NR-U DB.

In another embodiment, there can be an indication in a DCI format scheduling PDSCH of RMSI on triggering one of the sets of CSI-RS resources. For example, the DCI format is Format 1_0. For example, if 2 bits in the DCI format scheduling PDSCH of RMSI are utilized for triggering one of the sets of CSI-RS resources, TABLE 7 can be utilized. For another example, if 3 bits in the DCI format scheduling PDSCH of RMSI are utilized for triggering one of the sets of CSI-RS resources, TABLE 8 can be utilized. In one example, a pattern for time and frequency domain resources for CSI-RS is associated with a set of CSI-RS resources for the NR-U DB.

TABLE 7

Example of configuration in the DCI format scheduling PDSCH of RMSI on triggering sets of CSI-RS resources

| Value of 2-bit field in the DCI format scheduling PDSCH of RMSI | Indication |
| --- | --- |
| 0 | No CSI-RS configured |
| 1 | Set #1 of CSI-RS resources are configured |
| 2 | Set #2 of CSI-RS resources are configured |
| 3 | Set #3 of CSI-RS resources are configured |

TABLE 8

Example of configuration in the DCI format scheduling PDSCH of RMSI on triggering sets of CSI-RS resources

| Value of 3-bit field in the DCI format scheduling PDSCH of RMSI | Indication |
| --- | --- |
| 0 | No CSI-RS configured |
| 1 | Set #1 of CSI-RS resources are configured |
| 2 | Set #2 of CSI-RS resources are configured |
| 3 | Set #3 of CSI-RS resources are configured |
| 4 | Set #4 of CSI-RS resources are configured |
| 5 | Set #5 of CSI-RS resources are configured |
| 6 | Set #6 of CSI-RS resources are configured |
| 7 | Set #7 of CSI-RS resources are configured |

In yet another embodiment, there can be an indication in a DCI format scheduling PDSCH of RMSI on one configuration of CSI-RS resources. For example, if 2 bits in the DCI format scheduling PDSCH of RMSI are utilized for indicating one configuration of CSI-RS resources, TABLE 9 can be utilized. For another example, if 3 bits in the DCI format scheduling PDSCH of RMSI are utilized for indicating one configuration of CSI-RS resources, TABLE 10 can be utilized. In one example, a pattern for time and frequency domain resources for CSI-RS is included in a configuration of CSI-RS resources for the NR-U DB.

TABLE 9

Example of configuration in the DCI format scheduling PDSCH of RMSI on indicating a configuration of CSI-RS resources

| Value of 2-bit field in the DCI format scheduling PDSCH of RMSI | Indication |
|---|---|
| 0 | No CSI-RS configured |
| 1 | Configuration #1 of CSI-RS resources |
| 2 | Configuration #2 of CSI-RS resources |
| 3 | Configuration #3 of CSI-RS resources |

TABLE 10

Example of configuration in the DCI format scheduling PDSCH of RMSI on indicating a configuration of CSI-RS resources

| Value of 3-bit field in the DCI format scheduling PDSCH of RMSI | Indication |
|---|---|
| 0 | No CSI-RS configured |
| 1 | Configuration #1 of CSI-RS resources |
| 2 | Configuration #2 of CSI-RS resources |
| 3 | Configuration #3 of CSI-RS resources |
| 4 | Configuration #4 of CSI-RS resources |
| 5 | Configuration #5 of CSI-RS resources |
| 6 | Configuration #6 of CSI-RS resources |
| 7 | Configuration #7 of CSI-RS resources |

In yet another embodiment, there can be an indication in a DCI format scheduling PDSCH of RMSI on triggering one of the patterns for time and frequency domain resources for CSI-RS. For example, if 2 bits in the DCI format scheduling PDSCH of RMSI are utilized for triggering one of the patterns for time and frequency domain resources for CSI-RS, TABLE 11 can be utilized. For another example, if 3 bits in the DCI format scheduling PDSCH of RMSI are utilized for triggering one of the patterns for time and frequency domain resources for CSI-RS, TABLE 12 can be utilized.

TABLE 11

Example of configuration in the DCI format scheduling PDSCH of RMSI on triggering sets of CSI-RS resources

| Value of 2-bit field in the DCI format scheduling PDSCH of RMSI | Indication |
|---|---|
| 0 | No CSI-RS configured |
| 1 | Pattern #1 for time and frequency domain resources for CSI-RS |
| 2 | Pattern #2 for time and frequency domain resources for CSI-RS |
| 3 | Pattern #3 for time and frequency domain resources for CSI-RS |

TABLE 12

Example of configuration in the DCI format scheduling PDSCH of RMSI on triggering sets of CSI-RS resources

| Value of 3-bit field in the DCI format scheduling PDSCH of RMSI | Indication |
|---|---|
| 0 | No CSI-RS configured |
| 1 | Pattern #1 for time and frequency domain resources for CSI-RS |
| 2 | Pattern #2 for time and frequency domain resources for CSI-RS |
| 3 | Pattern #3 for time and frequency domain resources for CSI-RS |
| 4 | Pattern #4 for time and frequency domain resources for CSI-RS |
| 5 | Pattern #5 for time and frequency domain resources for CSI-RS |
| 6 | Pattern #6 for time and frequency domain resources for CSI-RS |
| 7 | Pattern #7 for time and frequency domain resources for CSI-RS |

In yet another embodiment, there can be no explicit indication of CSI-RS as part of NR-U DB, and the UE can determine whether a CSI-RS resource is configured within a DB transmission window based on the configuration of CSI-RS and configuration of DB transmission window. In one example, a UE assumes CSI-RS as part of NR-U DB is confined within the DB transmission window. In this sense, CSI-RS as part of NR-U DB is same as CSI-RS in the DB transmission window.

In one embodiment, a pattern for time and frequency domain resources for CSI-RS is defined as at least including a time domain resource as symbol index within a slot.

In one example, the symbol index can be any one from {0, 1, . . . , 13}. In one example, this approach can be applicable to the scenario wherein the DB is transmitted on a licensed-assisted-access (LAA) secondary cell (Scell).

In one example, the symbol index is configurable as any symbol that is not overlapping with symbols configured for CORESET #0 nor symbols configured for SS/PBCH blocks. In one example, this approach can be applicable to the scenario wherein the DB is transmitted on a SpCell.

Figure 11A:
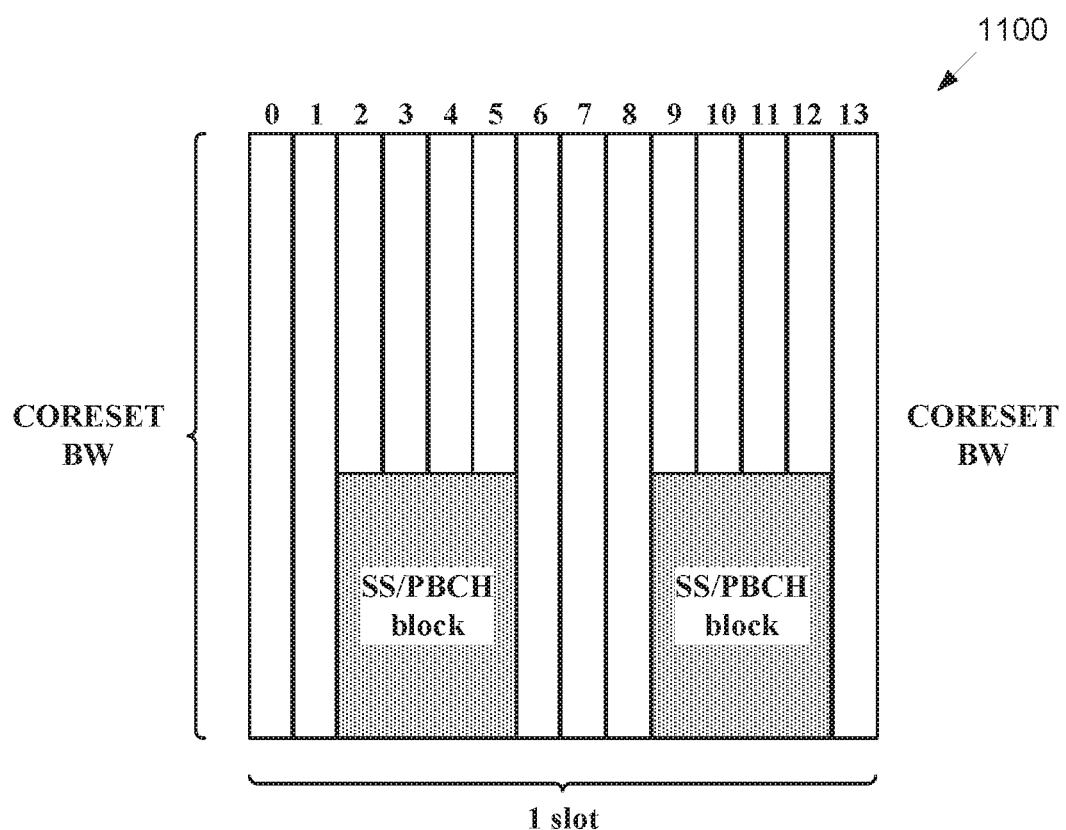
FIG. 11A illustrates an example SS/PBCH block patterns within a slot according to embodiments of the present disclosure.

FIG. 11A illustrates an example SS/PBCH block patterns within a slot 1100 according to embodiments of the present disclosure. An embodiment of the SS/PBCH block patterns within a slot 1100 shown in FIG. 11A is for illustration only. One or more of the components illustrated in FIG. 11A can be implemented in specialized circuitry configured to perform the noted functions or one or more of the components can be implemented by one or more processors executing instructions to perform the noted functions. Other embodiments are used without departing from the scope of the present disclosure.

In one example, if the SS/PBCH block time domain locations are symbols #2 to #5 for the first SS/PBCH block within a slot and #9 to #12 for the second SS/PBCH block within a slot as illustrated in FIG. 11A, then the configurable symbol for CSI-RS time domain resources can be one from {1, 6, 8, 13}. For instance, this example is applicable to the scenario that the number of symbols configured for CORESET #0 is 1.

Figure 11B:
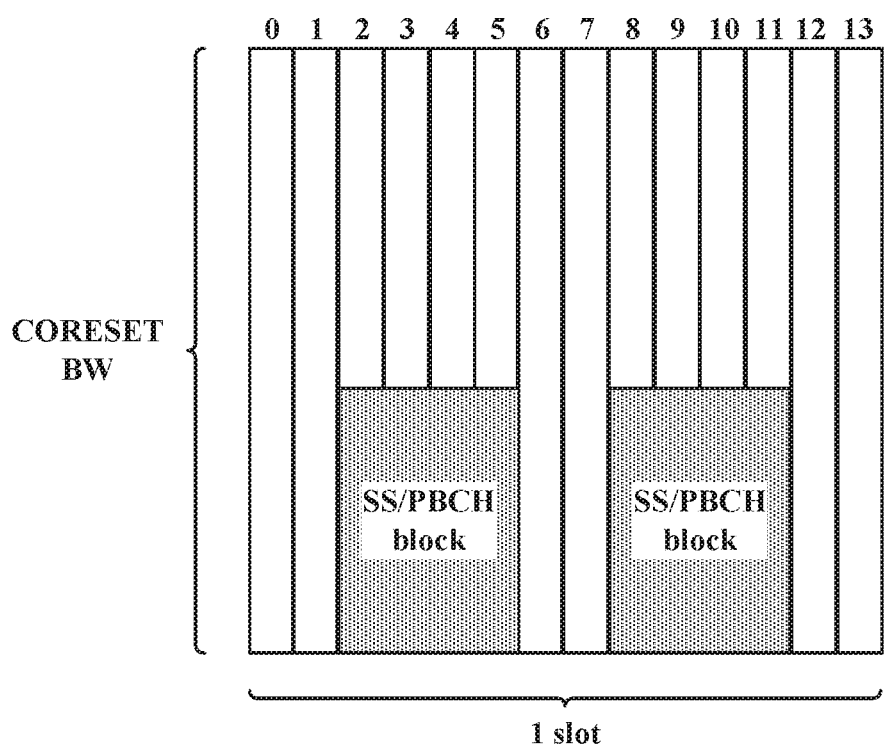
FIG. 11B illustrates another example SS/PBCH block pattern within a slot according to embodiments of the present disclosure.

FIG. 11B illustrates another example SS/PBCH block pattern within a slot 1150 according to embodiments of the present disclosure. An embodiment of the SS/PBCH block pattern within a slot 1150 shown in FIG. 11B is for illustration only. One or more of the components illustrated in FIG. 11B can be implemented in specialized circuitry configured to perform the noted functions or one or more of the components can be implemented by one or more processors executing instructions to perform the noted functions. Other embodiments are used without departing from the scope of the present disclosure.

In another example, if the SS/PBCH block time domain locations are symbols #2 to #5 for the first SS/PBCH block within a slot and #9 to #12 for the second SS/PBCH block within a slot as illustrated in FIG. 11A, then the configurable symbol for CSI-RS time domain resources can be one from {6, 13}. For instance, this example is applicable to the scenario that the number of symbols configured for CORESET #0 is 2.

In yet another example, if the SS/PBCH block time domain locations are symbols #2 to #5 for the first SS/PBCH block within a slot and #9 to #12 for the second SS/PBCH block within a slot as illustrated in FIG. 11A, and the configurable symbol for CSI-RS time domain resources is jointly coded with the number of CORESET symbols, then the configurable symbol for CSI-RS time domain resources can be one from {1, 6, 8, 13} if the number of symbols configured for CORESET #0 is 1, and the configurable symbol for CSI-RS time domain resources can be one from {6, 13} if the number of symbols configured for CORESET #0 is 2.

In yet another example, if the SS/PBCH block time domain locations are symbols #2 to #5 for the first SS/PBCH block within a slot and #9 to #12 for the second SS/PBCH block within a slot as illustrated in FIG. 11A, then the configurable symbol for CSI-RS time domain resources can be one from {6, 7, 8, 9, 10, 11, 12, 13}. For instance, this example is only applicable to the scenario that only the first SS/PBCH block within the slot is actually transmitted.

In one example, if the SS/PBCH block time domain locations are symbols #2 to #5 for the first SS/PBCH block within a slot and #8 to #11 for the second SS/PBCH block within a slot as illustrated in FIG. 11B, then the configurable symbol for CSI-RS time domain resources can be one from {1, 7, 12, 13}. For instance, this example is applicable to the scenario that the number of symbols configured for CORESET #0 is 1.

In another example, if the SS/PBCH block time domain locations are symbols #2 to #5 for the first SS/PBCH block within a slot and #8 to #11 for the second SS/PBCH block within a slot as illustrated in FIG. 11B, then the configurable symbol for CSI-RS time domain resources can be one from {12, 13}. For instance, this example is applicable to the scenario that the number of symbols configured for CORESET #0 is 2.

In yet another example, if the SS/PBCH block time domain locations are symbols #2 to #5 for the first SS/PBCH block within a slot and #8 to #11 for the second SS/PBCH block within a slot as illustrated in FIG. 11B, and the configurable symbol for CSI-RS time domain resources is jointly coded with the number of CORESET symbols, then the configurable symbol for CSI-RS time domain resources can be one from {1, 7, 12, 13} if the number of symbols configured for CORESET #0 is 1, and the configurable symbol for CSI-RS time domain resources can be one from {12, 13} if the number of symbols configured for CORESET #0 is 2.

In yet another example, if the SS/PBCH block time domain locations are symbols #2 to #5 for the first SS/PBCH block within a slot and #8 to #11 for the second SS/PBCH block within a slot as illustrated in FIG. 11B, then the configurable symbol for CSI-RS time domain resources can be one from {6, 7, 8, 9, 10, 11, 12, 13}. For instance, this example is only applicable to the scenario that only the first SS/PBCH block within the slot is actually transmitted.

In yet another approach, the symbol index is configurable as any symbol that is not overlapping with symbols configured for CORESET #0. In one example, this approach can be applicable to the scenario wherein the DB is transmitted on a SpCell.

In one example, if the SS/PBCH block time domain locations are symbols #2 to #5 for the first SS/PBCH block within a slot and #9 to #12 for the second SS/PBCH block within a slot as illustrated in FIG. 11A, then the configurable symbol for CSI-RS time domain resources can be one from {1, 2, 3, 4, 5, 6, 8, 9, 10, 11, 12, 13}. For instance, this example is applicable to the scenario that the number of symbols configured for CORESET #0 is 1.

In another example, if the SS/PBCH block time domain locations are symbols #2 to #5 for the first SS/PBCH block within a slot and #9 to #12 for the second SS/PBCH block within a slot as illustrated in FIG. 11A, then the configurable symbol for CSI-RS time domain resources can be one from {2, 3, 4, 5, 6, 9, 10, 11, 12, 13}. For instance, this example is applicable to the scenario that the number of symbols configured for CORESET #0 is 2.

In yet another example, if the SS/PBCH block time domain locations are symbols #2 to #5 for the first SS/PBCH block within a slot and #9 to #12 for the second SS/PBCH block within a slot as illustrated in FIG. 11A, and the configurable symbol for CSI-RS time domain resources is jointly coded with the number of CORESET symbols, then the configurable symbol for CSI-RS time domain resources can be one from {1, 2, 3, 4, 5, 6, 8, 9, 10, 11, 12, 13} if the number of symbols configured for CORESET #0 is 1, and the configurable symbol for CSI-RS time domain resources can be one from {2, 3, 4, 5, 6, 9, 10, 11, 12, 13} if the number of symbols configured for CORESET #0 is 2.

In yet another example, if the SS/PBCH block time domain locations are symbols #2 to #5 for the first SS/PBCH block within a slot and #9 to #11 for the second SS/PBCH block within a slot as illustrated in FIG. 11A, then the configurable symbol for CSI-RS time domain resources can be one from {2, 3, 4, 5, 6, 7, 8, 9, 10, 11, 12, 13}. For instance, this example is only applicable to the scenario that only the first SS/PBCH block within the slot is actually transmitted.

In one example, if the SS/PBCH block time domain locations are symbols #2 to #5 for the first SS/PBCH block within a slot and #8 to #11 for the second SS/PBCH block within a slot as illustrated in FIG. 11B, then the configurable symbol for CSI-RS time domain resources can be one from {1, 2, 3, 4, 5, 7, 8, 9, 10, 11, 12, 13}. For instance, this example is applicable to the scenario that the number of symbols configured for CORESET #0 is 1.

In another example, if the SS/PBCH block time domain locations are symbols #2 to #5 for the first SS/PBCH block within a slot and #8 to #11 for the second SS/PBCH block within a slot as illustrated in FIG. 11B, then the configurable symbol for CSI-RS time domain resources can be one from {2, 3, 4, 5, 8, 9, 10, 11, 12, 13}. For instance, this example is applicable to the scenario that the number of symbols configured for CORESET #0 is 2.

In yet another example, if the SS/PBCH block time domain locations are symbols #2 to #5 for the first SS/PBCH block within a slot and #8 to #11 for the second SS/PBCH block within a slot as illustrated in FIG. 11B, and the configurable symbol for CSI-RS time domain resources is jointly coded with the number of CORESET symbols, then the configurable symbol for CSI-RS time domain resources can be one from {1, 2, 3, 4, 5, 7, 8, 9, 10, 11, 12, 13} if the number of symbols configured for CORESET #0 is 1, and the configurable symbol for CSI-RS time domain resources can be one from {2, 3, 4, 5, 8, 9, 10, 11, 12, 13} if the number of symbols configured for CORESET #0 is 2.

In yet another example, if the SS/PBCH block time domain locations are symbols #2 to #5 for the first SS/PBCH block within a slot and #8 to #11 for the second SS/PBCH block within a slot as illustrated in FIG. 11B, then the configurable symbol for CSI-RS time domain resources can be one from {2, 3, 4, 5, 6, 7, 8, 9, 10, 11, 12, 13}. For instance, this example is only applicable to the scenario that only the first SS/PBCH block within the slot is actually transmitted.

In another embodiment, a pattern for time and frequency domain resources for CSI-RS is defined as at least including a predefined frequency domain resource.

In one example, the frequency domain resources are predefined as all the available consecutive bandwidth (e.g., as a multiple of 4 RBs) within the symbol for CSI-RS.

In one example, if symbol for CSI-RS is overlapping with symbols for SS/PBCH blocks, the frequency domain resources are predefined as the remaining BW within the CORESET BW, e.g., 28 RBs in term of 30 kHz SCS, or 76 RBs in term of 15 kHz SCS.

In on example, the frequency domain resources are associated to a predefined bitmap indicating the RE location within an RB.

In one example, the bit number within the bitmap taking value of 1 is associated to the index of the CSI-RS resources. E.g., the i-th CSI-RS resource is assumed to be mapped onto the bitmap with the i-th bit taking value of 1.

In one embodiment, a UE assumes the REs configured for CSI-RS as part of NR-U DB are not available for PDSCH. For example, a gNB may rate match around the REs configured for CSI-RS as part of NR-U DB.

In another embodiment, a UE assumes the REs determined based on the pattern for time and frequency domain resources for CSI-RS as part of NR-U DB are not available for PDSCH, wherein the pattern for time and frequency domain resources for CSI-RS can be predefined, or associated with a set of CSI-RS resources, or included in a configuration of CSI-RS resource, or indicated, as described in the previous embodiments of this disclosure.

In one example, a gNB may rate match around the REs determined based on the pattern for time and frequency domain resources.

In yet another embodiment, a UE assumes the REs configured for CSI-RS as part of NR-U DB are also available for PDSCH. In one example, a gNB may puncture the REs configured for CSI-RS as part of NR-U DB, if those REs are also scheduled for PDSCH.

When a CSI-RS as part of a NR-U DB (e.g., a first CSI-RS) has extra opportunity to be transmitted in other time domain locations within the DB transmission window (e.g., a second time domain location), other than the planned time domain location (e.g., a first time domain location), there may be other CSI-RS (e.g., a second CSI-RS) determined to be transmitted in the second time domain location.

In one embodiment, a UE assumes the collision cannot happen, e.g., a gNB performs a suitable configuration to avoid the collision. For example, the UE assumes the group of time domain locations within the DB transmission window for potential transmission of a CSI-RS resource cannot be configured for another CSI-RS resource.

Figure 12A:
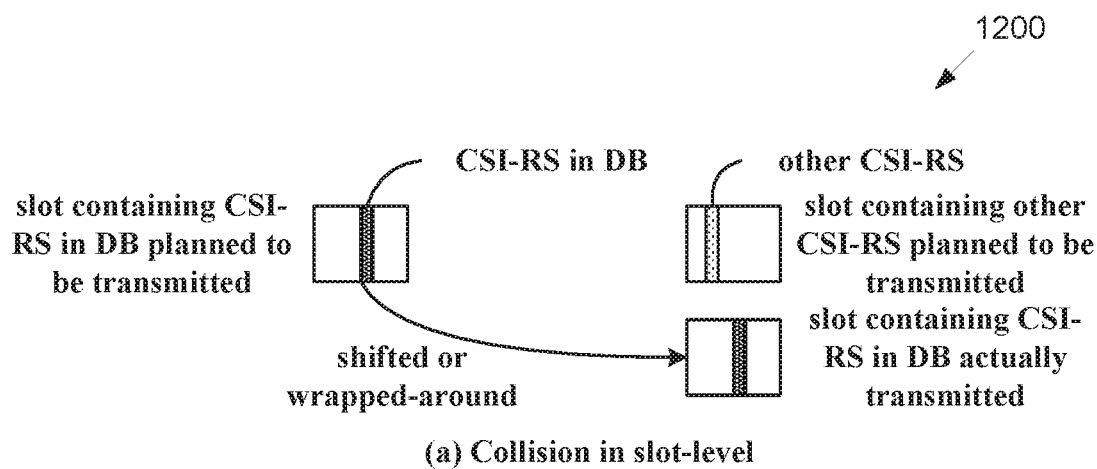
FIG. 12A illustrates an example CSI-RS collision according to embodiments of the present disclosure.

FIG. 12A illustrates an example CSI-RS collision 1200 according to embodiments of the present disclosure. An embodiment of the CSI-RS collision 1200 shown in FIG. 12A is for illustration only. One or more of the components illustrated in FIG. 12A can be implemented in specialized circuitry configured to perform the noted functions or one or more of the components can be implemented by one or more processors executing instructions to perform the noted functions. Other embodiments are used without departing from the scope of the present disclosure.

In another embodiment, if the slot containing the transmitted CSI-RS as part of a NR-U DB (e.g., the first CSI-RS) overlaps with the slot planned to contain the transmission of the second CSI-RS, the transmission of the second CSI-RS is dropped, and the UE only expects to receive the first CSI-RS in the overlapped slot (e.g., UE ignores the second CSI-RS). An illustration of this embodiment is shown in FIG. 12A.

In one example, this embodiment is applicable to the scenario that CSI-RS is shifted or wrapped around in the granularity of at least a slot.

Figure 12B:
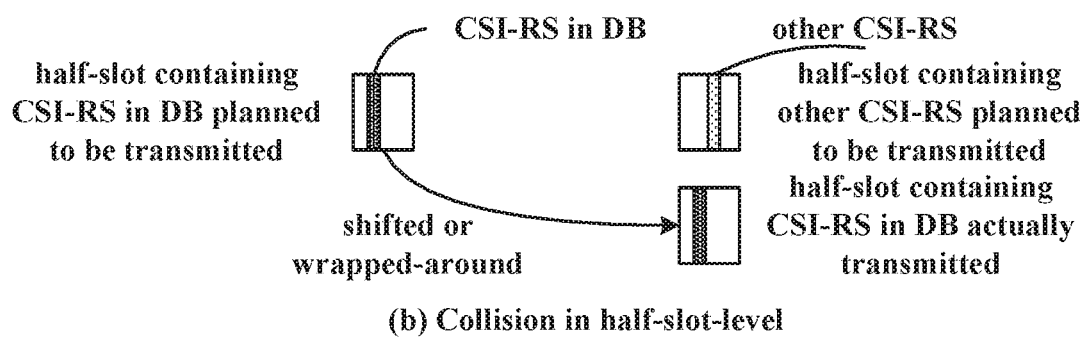
FIG. 12B illustrates another example CSI-RS collision according to embodiments of the present disclosure.

FIG. 12B illustrates another example CSI-RS collision 1220 according to embodiments of the present disclosure. An embodiment of the CSI-RS collision 1220 shown in FIG. 12B is for illustration only. One or more of the components illustrated in FIG. 12B can be implemented in specialized circuitry configured to perform the noted functions or one or more of the components can be implemented by one or more processors executing instructions to perform the noted functions. Other embodiments are used without departing from the scope of the present disclosure.

In yet another embodiment, if the half-slot containing the transmitted CSI-RS as part of a NR-U DB (e.g., the first CSI-RS) overlaps with the half-slot planned to contain the transmission of the second CSI-RS, the transmission of the second CSI-RS is dropped, and the UE only expects to receive the first CSI-RS in the overlapped half-slot. An illustration of this embodiment is shown in FIG. 12B.

In one example, this embodiment is applicable to the scenario that CSI-RS is shifted or wrapped around in the granularity of a half-slot.

Figure 12C:
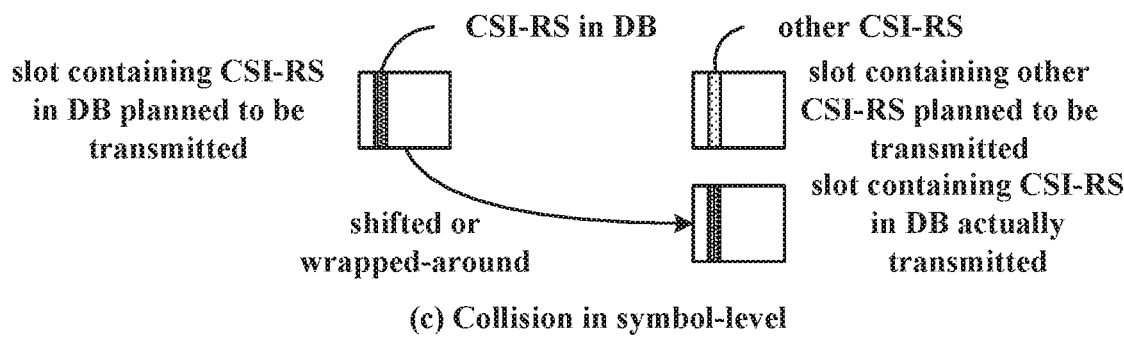
FIG. 12C illustrates yet another example CSI-RS collision according to embodiments of the present disclosure.

FIG. 12C illustrates yet another example CSI-RS collision 1240 according to embodiments of the present disclosure. An embodiment of the CSI-RS collision 1240 shown in FIG. 12C is for illustration only. One or more of the components illustrated in FIG. 12C can be implemented in specialized circuitry configured to perform the noted functions or one or more of the components can be implemented by one or more processors executing instructions to perform the noted functions. Other embodiments are used without departing from the scope of the present disclosure.

Figure 12D:
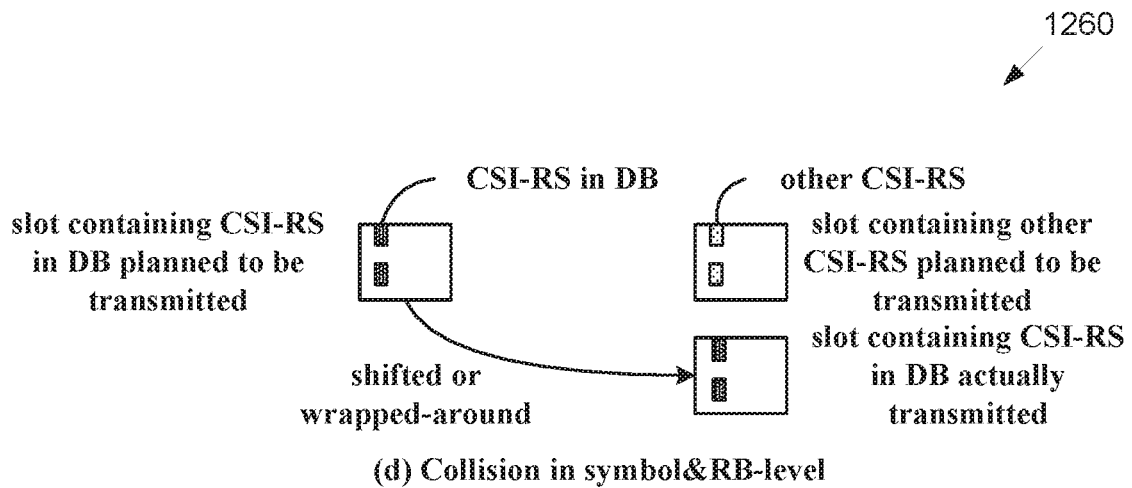
FIG. 12D illustrates yet another example CSI-RS collision according to embodiments of the present disclosure.

In yet another embodiment, if the symbol containing the transmitted CSI-RS as part of a NR-U DB (e.g., the first CSI-RS) overlaps with the symbol planned to contain the transmission of the second CSI-RS, the transmission of the second CSI-RS is dropped, and the UE only expects to receive the first CSI-RS in the overlapped symbol. An illustration of this embodiment is shown in FIG. 12C. FIG. 12D illustrates yet another example CSI-RS collision 1260 according to embodiments of the present disclosure. An embodiment of the CSI-RS collision 1260 shown in FIG. 12D is for illustration only. One or more of the components illustrated in FIG. 12D can be implemented in specialized circuitry configured to perform the noted functions or one or more of the components can be implemented by one or more processors executing instructions to perform the noted functions. Other embodiments are used without departing from the scope of the present disclosure.

In yet another embodiment, if the symbol containing the transmitted CSI-RS as part of a NR-U DB (e.g., the first CSI-RS) overlaps with the symbol planned to contain the transmission of the second CSI-RS, and at least one RB for the transmitted CSI-RS as part of a NR-U DB (e.g., the first CSI-RS) overlaps with at least one RB planned for the transmission of the second CSI-RS, the transmission of the second CSI-RS is dropped, and the UE only expects to receive the first CSI-RS in the overlapped symbol. An illustration of this embodiment is shown in FIG. 12D.

In one example for this embodiment, if all the RBs for all the transmitted CSI-RS resources configured as part of a NR-U DB do not overlap with all the RB planned for the transmission of all the CSI-RS resources within the overlapped symbol, both of the sets of CSI-RS can be transmitted, and a UE expects to receive both of the sets of CSI-RS resources.

Figure 12E:
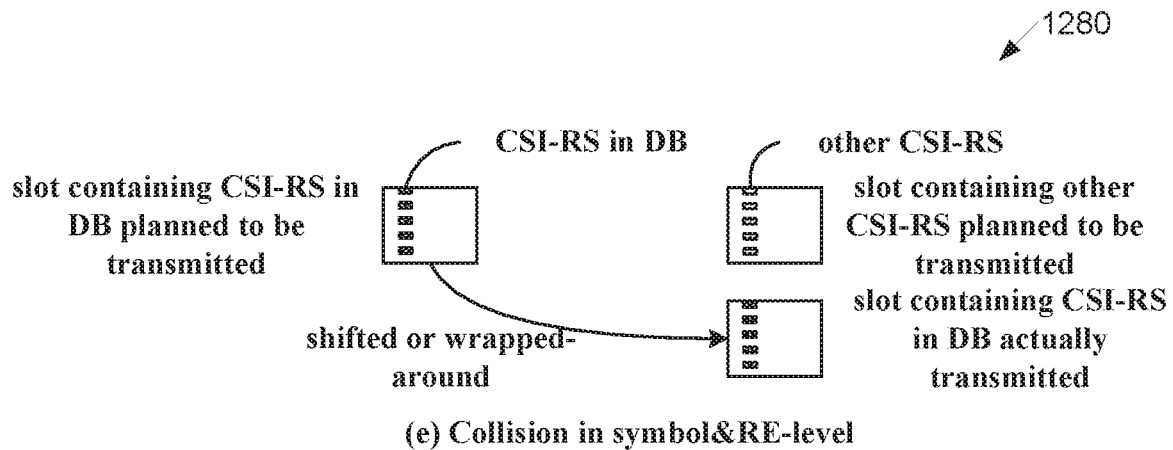
FIG. 12E illustrates yet another example CSI-RS collision according to embodiments of the present disclosure.

FIG. 12E illustrates yet another example CSI-RS collision 1280 according to embodiments of the present disclosure. An embodiment of the CSI-RS collision 1280 shown in FIG. 12E is for illustration only. One or more of the components illustrated in FIG. 12E can be implemented in specialized circuitry configured to perform the noted functions or one or more of the components can be implemented by one or more processors executing instructions to perform the noted functions. Other embodiments are used without departing from the scope of the present disclosure.

In yet another embodiment, if the symbol containing the transmitted CSI-RS as part of a NR-U DB (e.g., the first CSI-RS) overlaps with the symbol planned to contain the transmission of the second CSI-RS, and at least one RE for the transmitted CSI-RS as part of a NR-U DB (e.g., the first CSI-RS) overlaps with at least one RE planned for the transmission of the second CSI-RS, the transmission of the second CSI-RS is dropped, and the UE only expects to receive the first CSI-RS in the overlapped symbol. An illustration of this embodiment is shown in FIG. 12E.

In one example for this embodiment, if all the REs for all the transmitted CSI-RS resources configured as part of a NR-U DB do not overlap with all the RE planned for the transmission of all the CSI-RS resources within the overlapped symbol, both of the sets of CSI-RS can be transmitted, and a UE expects to receive both of the sets of CSI-RS resources.

Figure 13:
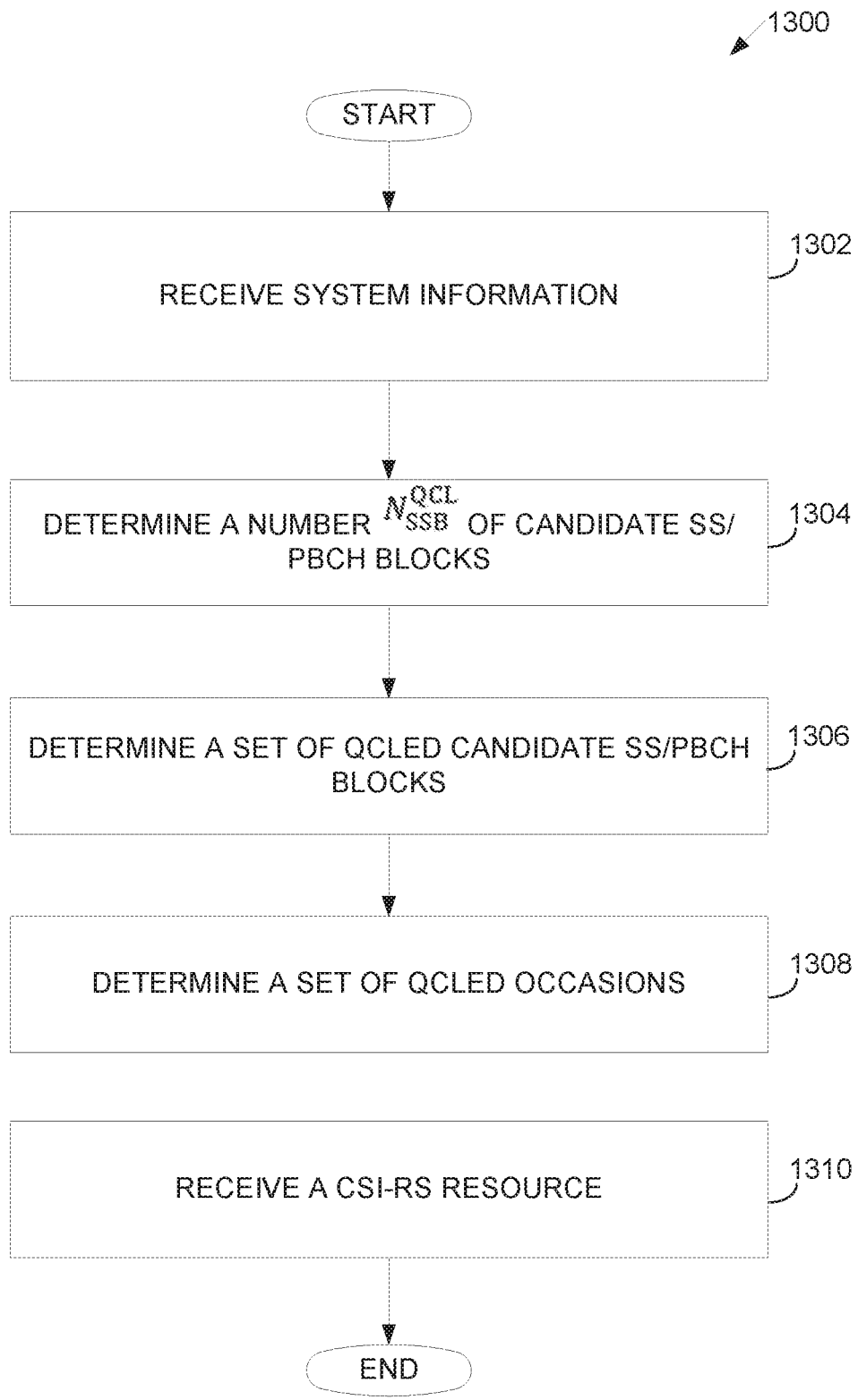
FIG. 13 illustrates a flow chart of a method for CSI-RS enhancement according to embodiments of the present disclosure.

FIG. 13 illustrates a flow chart of a method 1300 for CSI-RS enhancement according to embodiments of the present disclosure, as may be performed by a user equipment (e.g., 111-116 as illustrated in FIG. 1). An embodiment of the method 1300 shown in FIG. 13 is for illustration only. Other embodiments are used without departing from the scope of the present disclosure.

As illustrated in FIG. 13, the method 1300 begins at step 1302. In step 1302, the UE receives, from a base station (BS), system information indicating a discovery burst transmission window.

Subsequently, the UE in step 1304 determines a number $N_{SSB}^{QCL}$ of candidate synchronization signal and physical broadcast channel (SS/PBCH) blocks as an interval for a quasi-co-locate (QCL) assumption.

Subsequently, the UE in step 1306 determines a set of QCLed candidate SS/PBCH blocks within the discovery burst transmission window based on the number $N_{SSB}^{QCL}$ of candidate SS/PBCH blocks Next, the UE in step 1308 determines a set of QCLed occasions within the discovery burst transmission window included in the system information.

In one embodiment, the set of QCLed occasions within the discovery burst transmission window includes a value of $\bar{n}_{s,f}^{\mu}$ mod (max ($N_{SSB}^{QCL}/2,1$)) where $\bar{n}_{s,f}^{\mu}$ is a slot index of an occasion in the set of QCLed occasions each of which includes a same value of $\bar{n}_{s,f}^{\mu}$ mod (max ($N_{SSB}^{QCL}/2,1$)), respectively.

Finally, the UE in step 1310 receives, from the BS, a channel state information reference signal (CSI-RS) resource based on the determined set of QCLed occasions within the discovery burst transmission window.

In one embodiment, the CSI-RS resource is configured as to be associated with the set of QCLed candidate SS/PBCH blocks.

In one embodiment, the UE further determines a CSI-RS sequence in the set of QCLed occasions within the discovery burst transmission window. In such embodiment, an initial condition of the CSI-RS sequence includes a slot index given by $\bar{n}_{s,f}^{\mu}$ mod (max ($N_{SSB}^{QCL}/2,1$)) and each of the set of QCLed occasions includes a same CSI-RS sequence, respectively.

In one embodiment, the UE further receives a maximum number of CSI-RS in the set of QCLed occasions within the discovery burst transmission window, and wherein the maximum number of CSI-RS is determined as one.

In one embodiment, the UE further receives an SS/PBCH block in the set of QCLed candidate SS/PBCH blocks; determines to assume that a CSI-RS is received in a slot that was used to receive the SS/PBCH block; and receives other CSI-RS resources in the set of QCLed occasions within the discovery burst transmission window.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system supporting a shared spectrum channel access, the UE comprising:
   a transceiver configured to receive, from a base station (BS), system information indicating a discovery burst transmission window; and
   a processor operably connected to the transceiver, the processor configured to determine a set of quasi-co-located (QCLed) occasions within the discovery burst transmission window included in the system information, the determined set of QCLed occasions associated with antenna ports having common properties for a downlink reception,
   wherein the transceiver is further configured to receive, from the BS, a channel state information reference signal (CSI-RS) resource based on the determined set of QCLed occasions within the discovery burst transmission window.

2. The UE of claim 1, wherein the set of QCLed occasions within the discovery burst transmission window includes a value of $\bar{n}_{s,f}^{\mu}$ mod (max ($N_{SSB}^{QCL}/2,1$)) where $\bar{n}_{s,f}^{\mu}$ is a slot index of an occasion in the set of QCLed occasions each of which includes a same value of $\bar{n}_{s,f}^{\mu}$ mod (max ($N_{SSB}^{QCL}/2,1$)), respectively.

3. The UE of claim 1, wherein:
the processor is further configured to:
determine a number $N_{SSB}^{QCL}$ of candidate synchronization signal and physical broadcast channel (SS/PBCH) blocks as an interval for a QCL assumption, and
determine a set of QCLed candidate SS/PBCH blocks within the discovery burst transmission window based on the number $N_{SSB}^{QCL}$ of candidate SS/PBCH blocks; and
the CSI-RS resource is configured to be associated with the set of QCLed candidate SS/PBCH blocks.

4. The UE of claim 1, wherein:
the processor is further configured to determine a CSI-RS sequence in the set of QCLed occasions within the discovery burst transmission window;
an initial condition of the CSI-RS sequence includes a slot index given by $\bar{n}_{s,f}^{\mu}$ mod (max $(N_{SSB}^{QCL}/2,1)$); and
each of the set of QCLed occasions includes a same CSI-RS sequence, respectively.

5. The UE of claim 1, wherein the transceiver is further configured to receive a maximum number of CSI-RS in the set of QCLed occasions within the discovery burst transmission window, and wherein the maximum number of CSI-RS is determined as one.

6. The UE of claim 1, wherein:
the transceiver is further configured to receive an SS/PBCH block in the set of QCLed candidate SS/PBCH blocks; and
the processor is further configured to determine to assume that a CSI-RS is received in a slot that was used to receive the SS/PBCH block.

7. The UE of claim 1, wherein the transceiver is further configured not to receive other CSI-RS resources in the set of QCLed occasions within the discovery burst transmission window.

8. A base station (BS) in a wireless communication system supporting a shared spectrum channel access, the BS comprising:
a processor configured to determine a set of quasi-co-located (QCLed) occasions within the discovery burst transmission window, the determined set of QCLed occasions associated with antenna ports having common properties for a downlink reception; and
a transceiver operably connected to the processor, the transceiver configured to:
transmit, to a user equipment (UE), system information indicating the discovery burst transmission window, and
transmit, to the UE, a channel state information reference signal (CSI-RS) resource based on the determined set of QCLed occasions within the discovery burst transmission window.

9. The BS of claim 8, wherein the set of QCLed occasions within the discovery burst transmission window includes a value of $\bar{n}_{s,f}^{\mu}$ mod (max $(N_{SSB}^{QCL}/2,1)$) where $\bar{n}_{s,f}^{\mu}$ is a slot index of an occasion in the set of QCLed occasions each of which includes a same value of $\bar{n}_{s,f}^{\mu}$ mod (max $(N_{SSB}^{QCL}/2,1)$), respectively.

10. The BS of claim 8, wherein:
the processor is further configured to:
determine a number $N_{SSB}^{QCL}$ of candidate synchronization signal and physical broadcast channel (SS/PBCH) blocks as an interval for a QCL assumption, and
determine a set of QCLed candidate SS/PBCH blocks within the discovery burst transmission window based on the number $N_{SSB}^{QCL}$ of candidate SS/PBCH blocks; and
the CSI-RS resource is configured as to be associated with the set of QCLed candidate SS/PBCH blocks.

11. The BS of claim 8, wherein:
the processor is further configured to determine a CSI-RS sequence in the set of QCLed occasions within the discovery burst transmission window;
an initial condition of the CSI-RS sequence includes a slot index given by $\bar{n}_{s,f}^{\mu}$ mod (max $(N_{SSB}^{QCL}/2,1)$); and
each of the set of QCLed occasions includes a same CSI-RS sequence, respectively.

12. The BS of claim 8, wherein the transceiver is further configured to transmit a maximum number of CSI-RS in the set of QCLed occasions within the discovery burst transmission window, and wherein the maximum number of CSI-RS is determined as one.

13. The BS of claim 8, wherein:
the transceiver is further configured to transmit an SS/PBCH block in the set of QCLed candidate SS/PBCH blocks; and
the processor is further configured to determine to assume that a CSI-RS is received in a slot that was used to receive the SS/PBCH block.

14. The BS of claim 8, wherein the transceiver is further configured not to transmit other CSI-RS resources in the set of QCLed occasions within the discovery burst transmission window.

15. A method of a user equipment (UE) in a wireless communication system supporting a shared spectrum channel access, the method comprising:
receiving, from a base station (BS), system information indicating a discovery burst transmission window;
determining a set of quasi-co-located (QCLed) occasions within the discovery burst transmission window included in the system information, the determined set of QCLed occasions associated with antenna ports having common properties for a downlink reception; and
receiving, from the BS, a channel state information reference signal (CSI-RS) resource based on the determined set of QCLed occasions within the discovery burst transmission window.

16. The method of claim 15, wherein the set of QCLed occasions within the discovery burst transmission window includes a value of $\bar{n}_{s,f}^{\mu}$ mod (max $(N_{SSB}^{QCL}/2,1)$) where $\bar{n}_{s,f}^{\mu}$ is a slot index of an occasion in the set of QCLed occasions each of which includes a same value of $\bar{n}_{s,f}^{\mu}$ mod (max $(N_{SSB}^{QCL}/2,1)$), respectively.

17. The method of claim 15, further comprising:
determining a number $N_{SSB}^{QCL}$ of candidate synchronization signal and physical broadcast channel (SS/PBCH) blocks as an interval for a QCL assumption, and
determining a set of QCLed candidate SS/PBCH blocks within the discovery burst transmission window based on the number $N_{SSB}^{QCL}$ of candidate SS/PBCH blocks,
wherein the CSI-RS resource is configured as to be associated with the set of QCLed candidate SS/PBCH blocks.

18. The method of claim 15, further comprising determining a CSI-RS sequence in the set of QCLed occasions within the discovery burst transmission window, wherein:
an initial condition of the CSI-RS sequence includes a slot index given by $\bar{n}_{s,f}^{\mu}$ mod (max $(N_{SSB}^{QCL}/2,1)$); and each of the set of QCLed occasions includes a same CSI-RS sequence, respectively.

19. The method of claim 15, further comprising receiving a maximum number of CSI-RS in the set of QCLed occasions within the discovery burst transmission window, and wherein the maximum number of CSI-RS is determined as one.

20. The method of claim 15, further comprising:
receiving an SS/PBCH block in the set of QCLed candidate SS/PBCH blocks;
determining to assume that a CSI-RS is received in a slot that was used to receive the SS/PBCH block; and
receiving other CSI-RS resources in the set of QCLed occasions within the discovery burst transmission window.

\* \* \* \* \*